(12) United States Patent
Yoon et al.

(10) Patent No.: US 10,137,395 B2
(45) Date of Patent: Nov. 27, 2018

(54) GREASE FILTER, MANUFACTURING METHOD THEREOF AND COOKING DEVICE HAVING THE SAME

(71) Applicant: SAMSUNG ELECTRONICS CO., LTD., Suwon-si, Gyeonggi-do (KR)

(72) Inventors: Byeong Cheol Yoon, Suwon-si (KR); Sang Young So, Seongnam-si (KR); Kyu Ho Shin, Seoul (KR); Hee Soo Jeong, Suwon-si (KR); Seok Man Hong, Gwangju (KR); Hyun Jung Kim, Suwon-si (KR); Ji Yeon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 731 days.

(21) Appl. No.: 14/510,617

(22) Filed: Oct. 9, 2014

(65) Prior Publication Data

US 2015/0101588 A1    Apr. 16, 2015

(30) Foreign Application Priority Data

Oct. 11, 2013  (KR) .................. 10-2013-0121148
Aug. 7, 2014   (KR) .................. 10-2014-0101496

(51) Int. Cl.
*B01D 47/00*     (2006.01)
*B01D 46/00*     (2006.01)
(Continued)

(52) U.S. Cl.
CPC ......... *B01D 46/0045* (2013.01); *B01D 45/06* (2013.01); *B01D 45/08* (2013.01);
(Continued)

(58) Field of Classification Search
CPC .... B01D 45/08; B01D 45/06; B01D 46/0045; B01D 46/0087; F24C 15/2035;
(Continued)

(56) References Cited

U.S. PATENT DOCUMENTS 3,910,782 A * 10/1975 Struble ................. B01D 45/08
                                                      126/299 D
3,945,812 A *  3/1976 Doane .................. B01D 45/08
                                                      95/272
(Continued)

FOREIGN PATENT DOCUMENTS

DE        8307964 U1    9/1983
DE    102005019831 A1   11/2006
(Continued)

OTHER PUBLICATIONS

Extended European Search Report dated Mar. 16, 2015 in corresponding European Patent Application No. 14188502.0.

*Primary Examiner* — Dung H Bui
(74) *Attorney, Agent, or Firm* — Staas & Halsey LLP

(57) ABSTRACT

A grease filter, which includes a first channel having an inlet portion through which oil particles flow in, and a first guide unit configured to guide the oil particles flowing in through the inlet portion, and a second channel having an outlet portion through which the oil particles and air current flowing in through the inlet portion is discharged into the outside, and at least one second guide unit configured to guide the oil particles and air current to be discharged through the outlet portion. Here, the first channel and the second channel are detachably provided. The grease filter can be easily repaired and maintained, and collection efficiency can be improved due to such a configuration.

36 Claims, 24 Drawing Sheets
(3 of 24 Drawing Sheet(s) Filed in Color)

(51) Int. Cl.
  *B01D 45/06*  (2006.01)
  *B01D 45/08*  (2006.01)
  *F24C 15/20*  (2006.01)
(52) U.S. Cl.
  CPC .......... *B01D 46/0087* (2013.01); *F24C 15/20*
    (2013.01); *F24C 15/2035* (2013.01); ***F24C
    15/2092* (2013.01); *Y10T 29/49826*** (2015.01)
(58) Field of Classification Search
  CPC ................. F24C 15/2092; F24C 15/20; Y10T
    24/44769; Y10T 24/44923; Y10T
    29/49826
  See application file for complete search history.

(56) References Cited

U.S. PATENT DOCUMENTS

| | | | | |
|---|---|---|---|---|
| 4,830,644 | A | | 5/1989 | Gutermuth |
| 5,302,174 | A | * | 4/1994 | Guetersloh ............ B01D 45/08 55/444 |
| 6,041,772 | A | * | 3/2000 | Ward ....................... F24C 15/20 126/299 D |
| 6,454,825 | B1 | * | 9/2002 | Cheimets ............... B01D 45/08 55/446 |
| 9,182,131 | B1 | * | 11/2015 | Prasser .................. B01D 50/00 |
| 2004/0107956 | A1 | * | 6/2004 | Lee ..................... F24C 15/2035 126/299 R |
| 2005/0000199 | A1 | | 1/2005 | Carter |
| 2005/0087069 | A1 | * | 4/2005 | Entezarian ............ B01D 45/08 95/272 |
| 2006/0032492 | A1 | * | 2/2006 | Bagwell ................... F15D 1/02 126/299 R |
| 2006/0157048 | A1 | * | 7/2006 | Heilman ............. F24C 15/2035 126/299 R |
| 2007/0163216 | A1 | * | 7/2007 | Smasal ............... F24C 15/2035 55/446 |
| 2008/0110339 | A1 | * | 5/2008 | Kwok ................. F24C 15/2035 95/31 |
| 2008/0202083 | A1 | * | 8/2008 | Graham ................. B01D 45/06 55/444 |
| 2009/0019822 | A1 | * | 1/2009 | Feisthammel ...... F24C 15/2035 55/385.4 |
| 2009/0194093 | A1 | * | 8/2009 | Aviles .................... B01D 45/06 126/299 E |
| 2012/0060820 | A1 | * | 3/2012 | Sikkenga ............... B01D 45/08 126/1 R |
| 2012/0079946 | A1 | * | 4/2012 | Dold ....................... B01D 45/18 96/425 |
| 2013/0133639 | A1 | * | 5/2013 | Lee ..................... F24C 15/2035 126/299 D |
| 2014/0165832 | A1 | * | 6/2014 | Antoun .................. B01D 45/04 95/270 |
| 2014/0345461 | A1 | * | 11/2014 | Sikkenga ............... B01D 45/16 95/272 |
| 2014/0366496 | A1 | * | 12/2014 | Salpietra ............. F24C 15/2035 55/350.1 |
| 2015/0101588 | A1 | * | 4/2015 | Yoon ..................... B01D 45/08 126/299 D |

FOREIGN PATENT DOCUMENTS

| | | |
|---|---|---|
| WO | 2009/106804 A2 | 9/2009 |
| WO | 2009/106804 A3 | 9/2009 |

* cited by examiner

GREASE FILTER, MANUFACTURING METHOD THEREOF AND COOKING DEVICE HAVING THE SAME

CROSS-REFERENCE TO RELATED APPLICATIONS

This application claims the benefit of Korean Patent Application Nos. 10-2013-0121148 and 10-2014-0101496, filed on Oct. 11, 2013 and Aug. 7, 2014, respectively, in the Korean Intellectual Property Office, the disclosures of which are incorporated herein by reference.

BACKGROUND

1. Field

Embodiments of the present disclosure relate to a grease filter, and, more particularly, to a grease filter having improved oil collection efficiency.

2. Description of the Related Art

In general, a ventilating system is installed in the kitchen. The ventilating system serves to discharge polluted air (noxious gases) generated in a process of cooking foods to the outside and introduce fresh air into the interior, thereby making the residential environment more comfortable.

The ventilating system is provided with a filter configured to remove noxious gases and a grease filter configured to prevent oil particles from accumulating in a duct so that the noxious gases generated in a kitchen cannot be directly discharged into the air and pollutants such as oils can be collected to discharge purified air into the air.

Such a grease filter serves to collect fine oil particles generated while cooking so as to prevent the duct and other driving devices of the ventilating system from being polluted by the fine oil particles. To effectively collect the oil particles, the oil particles should flow and collide to a filter present in the flow field while flowing so that the flow of the oil particles is interrupted by the filter. As a result, the fine particles should lump with each other to be collected.

However, interrupting the flow of the oil particles or allowing the oil particles to adhere to the filter may cause the pressure drop in the flow field, resulting in degraded energy efficiency of the ventilating system and an increase in flow noise and vibration noise.

Also, when the oil particles accumulate on the grease filter, the grease filter cannot be easily cleaned, which makes it difficult to continuously maintain the filter efficiency.

SUMMARY

Therefore, it is an aspect of the present disclosure to provide a grease filter capable of continuously maintaining performance of a filter and reducing the pressure drop caused while air including oil particles passes through the grease filter.

Therefore, it is an aspect of the present disclosure to provide a grease filter capable of enhancing oil collection efficiency.

Additional aspects of the disclosure will be set forth in part in the description which follows and, in part, will be apparent from the description, or may be learned by practice of the disclosure.

According to one aspect of the present disclosure, a grease filter includes at least one first baffle plate having an inlet portion through which oil particles flow in and at least one first guide unit configured to guide an air current flowing in through the inlet portion, at least one second baffle plate arranged to face the first baffle plate and having an outlet portion through which the air current flowing in through the inlet portion is discharged into the outside and at least one second guide unit to guide the air current configured to discharge the air current through the outlet portion. In this case, the at least one first baffle plate and the at least one second baffle plate may be detachably provided.

The first guide unit may be formed in a first direction, the second guide unit may be formed in a second direction opposite to the first direction, and the first baffle plate and the second baffle plate may be detachably provided in the first direction and the second direction, respectively.

The at least one first guide unit and the at least one second guide unit may include a plurality of first guide units and a plurality of second guide units, respectively, and the plurality of first guide units and the plurality of second guide units may be alternately arranged.

The plurality of first guide units and the plurality of second guide units may be arranged in plural numbers to be spaced apart at predetermined intervals.

The first baffle plate and the second baffle plate may be formed so that the first baffle plate and the second baffle plate is at least partially separated from each other.

Each of the first baffle plate and the second baffle plate may include a stopper to prevent the first baffle plate and the second baffle plate from being separated beyond predetermined bounds.

The at least one first guide unit may include a plurality of first guide units, and the first baffle plate coupled to the second baffle plate may move within a guide gap that is a gap between one of the plurality of first guide units and another first guide unit adjacent to the one first guide unit, and then may be separated in a direction opposite to a facing direction of the second baffle plate with respect to the guide gap.

The at least one first guide unit may include an inlet guide inclined obliquely toward the at least one second baffle plate, and a first direction change guide curved from the inlet guide, and the at least one second guide unit may include an outlet guide inclined obliquely toward the at least one first baffle plate, and a second direction change guide curved from the outlet guide.

The first direction change guide and the second direction change guide may be formed spaced apart to face each other.

The at least one first baffle plate and the at least one second baffle plate may further include a first frame and a second frame, respectively. Here, the first frame and the second frame may be in a case shape, and the first guide unit and the second guide unit may be fixed in the first frame and the second frame, respectively. Also, the at least one first guide unit may include a first support unit formed to extend from the inlet guide and fixed in the first frame, and the at least one second guide unit may include a second support unit formed to extend from the outlet guide and fixed in the second frame.

The first guide unit and the second guide unit may be provided in S-letter shapes, respectively.

The first support unit may be provided to form an obtuse angle with a first inlet surface that is one plane of the inlet guide, and the first direction change guide may be provided to form an obtuse angle with a second inlet plane that is the other surface of the first inlet plane.

The second support unit may be provided to form an obtuse angle with a first outlet surface of the outlet guide, and the second direction change guide may be provided to form an obtuse angle with a second outlet surface that is a surface opposite to the first outlet plane.

The grease filter may include a path formed by the first baffle plate and the second baffle plate. Here, the path may include a direction change path spanning between the first direction change portion and the second direction change portion, and a guide path bypassing the first direction change portion and the second direction change portion and formed between the inlet guide unit and the outlet guide unit.

The direction change path is formed so that the direction change path has a longer course than the guide path.

Each of the first baffle plate and the second baffle plate may be formed by press processing.

The at least one first guide unit and the at least one first baffle plate may include a plurality of first guide units and a plurality of first baffle plates, respectively. Here, the plurality of first baffle plates may be coupled to overlap each other with respect to a guide gap that is a gap between one of the plurality of first guide units and another first guide unit adjacent to the one first guide unit, so that the first guide unit of one of the plurality of first baffle plates is arranged between other guide gaps.

The at least one first baffle plate and the at least one second baffle plate may include a plurality of first baffle plates and a plurality of second baffle plates, respectively. Here, the first baffle plates may be provided to overlap so that a first support unit of one of the plurality of first baffle plates is arranged on an inlet portion of another of the plurality of first baffle plates, and the second baffle plates may be provided to overlap so that a second support unit of one of the plurality of second baffle plates is arranged on an outlet portion of another of the plurality of second baffle plates.

The first baffle plate and the second baffle plate may be formed of a metal material.

Each of the first baffle plate and the second baffle plate may include a filtering mode operated to enable the flow of an air current through the direction change path and the guide path, and a ventilation mode operated to allow the first direction change guide and the second direction change guide to closely adhere to each other so as to close the direction change path.

Each of the first baffle plate and the second baffle plate may further include a release mode operated to allow the inlet guide and the outlet guide to closely adhere to each other so that the first baffle plate and the second baffle plate are spaced apart in a facing direction.

According to another aspect of the present disclosure, a manufacturing method of a grease filter includes forming at least one upper channel having an upper frame forming a case and a plurality of upper guides formed integrally with the upper frame and arranged in first direction, forming at least one lower channel having a lower frame forming a case and a plurality of lower guides formed integrally with the lower frame and arranged in a second direction opposite to the first direction, and detachably coupling the at least one upper channel and the at least one lower channel in the first direction and the second direction, respectively.

The plurality of upper guides may be arranged spaced apart at predetermined intervals, and the at least one upper channel and the at least one lower channel may be press-fit together so that the plurality of respective lower guides are arranged between the plurality of upper guides.

The upper guides and the lower guides may be formed by press processing so that the upper guides and the lower guides are at least partially separated from the upper frame and the lower frame, respectively.

The at least one upper channel and the at least one lower channel may include a plurality of upper channels and a plurality of lower channels, respectively, and the plurality of upper channels and the plurality of lower channels may be formed so that the plurality of upper channels and the plurality of lower channels can overlap each other.

According to still another aspect of the present disclosure, a cooking device includes a main body provided at an upper portion of a cooking apparatus and having a suction unit formed at a lower portion thereof to suck an air current and oil particles generated in a cooking process, and a grease filter provided to collect the oil particles sucked through the suction unit. Here, the grease filter includes a plurality of upper channels having an upper support unit forming an inlet portion through which the oil particles flow in, and a plurality of lower channels having a lower support unit forming an outlet portion configured to discharge the oil particles flowing in through the inlet portion to the outside, the plurality of upper channels are provided to overlap so that an upper support unit of one of the plurality of upper channels is arranged on an inlet portion of another of the plurality of upper channels, and the plurality of lower channels are provided to overlap so that a lower support unit of one of the plurality of lower channels is arranged on an outlet portion of another of the plurality of lower channels.

The upper support unit may be formed in a first direction, the lower support unit may be formed in a second direction opposite to the first direction, and the plurality of upper channels and the plurality of lower channels may be detachably provided in the first direction and the second direction, respectively.

According to still another aspect of the present disclosure, a grease filter includes an opening, a path through which an air current flowing in or out through the opening floats, and a plurality of channels having a plurality of guide units forming the path. Here, the plurality of channels are stacked so that the plurality of guide units of one of the plurality of channels are arranged on the path of another channel.

The plurality of guide units of the one channel may be arranged side by side with the plurality of guide units of the another channel.

The plurality of channels may include a plurality of first baffle plates stacked with each other, and a plurality of second baffle plates configured to face the plurality of first baffle plates and stacked with each other, and the plurality of guide units may include a plurality of first guide units provided at the plurality of first baffle plates, and a plurality of second guide units provided at the plurality of second baffle plates and arranged alternately with the plurality of first guide units.

The plurality of first guide units may be formed in a first direction that is a longitudinal direction, the plurality of second guide units may be formed in a second direction opposite to the first direction, and the plurality of first baffle plates and the plurality of second baffle plates may move in the first direction and the second direction, respectively, so that the plurality of first baffle plates and the plurality of second baffle plates are provided to be at least partially spaced apart from each other.

The plurality of first baffle plates may include a first stopper, and the plurality of second baffle plates may include a second stopper provided to limit the movement thereof within predetermined bounds by the first stopper while moving in the second direction.

The plurality of first guide may include a plurality of inlet guides inclined obliquely toward the second baffle plates, and a plurality of first direction change guides curved from the plurality of inlet guides, and the plurality of second guide units may include a plurality of outlet guides inclined obliquely toward the first baffle plates, and a plurality of second direction change guides curved from the plurality of outlet guides.

The plurality of inlet guides and the plurality of outlet guides may be arranged side by side with each other.

The plurality of first direction change guides and the plurality of second direction change guides may be formed spaced apart to face each other.

The path may include a direction change path spanning between the plurality of first direction change guides and the plurality of second direction change guides, and a guide path spanning between the inlet guides and the outlet guides to bypass the direction change guide.

The direction change path may be formed to have a longer course than the guide path.

The plurality of channels may be formed by press forming.

The plurality of channels may be provided so that the opening is formed by the press forming and the guide units are formed by the press forming to have the same width as the opening.

According to still another aspect of the present disclosure, a grease filter includes an opening, a path through which oil particles flowing in or out through the opening floats, and a plurality of channels having a plurality of guide units forming the path. Here, the plurality of channels are stacked so that the plurality of guide units of one of the plurality of channels are arranged between the plurality of guide units of another channel.

According to still another aspect of the present disclosure, a grease filter includes a first baffle plate having a first guide unit formed in a first direction that is a longitudinal direction, and a second baffle plate having a second guide unit formed in a second direction perpendicular to the first direction to form a path with the first guide unit and provided to face the first baffle plate. Here, the first baffle plate and the second baffle plate are provided so that the first baffle plate and the second baffle plate are at least partially spaced apart in the first direction or the second direction, respectively.

According to still another aspect of the present disclosure, a grease filter includes a first baffle plate having a plurality of first guide units, and a second baffle plate having a plurality of second guide units arranged alternately with the plurality of first guide units and arranged to face the first baffle plate. Here, each of the first baffle plate and the second baffle plate includes a first mode operated so that the plurality of first guide units and the plurality of second guide units is arranged spaced apart from each other, and a second mode operated so that the plurality of first guide units and the plurality of second guide units are arranged closely with each other.

One channel of the first baffle plate and the second baffle plate may move relative to the other channel in the first mode and the second mode.

The plurality of first guide units may include a plurality of inlet guides inclined obliquely toward the second baffle plate, and a plurality of first direction change guides curved from the plurality of inlet guides, and the plurality of second guide units may include a plurality of outlet guide inclined obliquely toward the first baffle plate, and a plurality of second direction change guides curved from the plurality of outlet guides.

The grease filter may include a path formed by the plurality of first guide units and the plurality of second guide units. Here, the path may include a direction change path spanning between the plurality of first direction change guides and the plurality of second direction change guides, and a guide path spanning between the inlet guides and the outlet guides to bypass the direction change guide.

The first baffle plate and the second baffle plate may be operated in the first mode to enable the flow of an air current through the direction change path and the guide path, and may be operated in the second mode to allow the first direction change guide and the second direction change guide to closely adhere to each other so as to close the direction change path.

The second mode may be formed so that the direction change path can have a narrower width than the guide path, compared to the first mode.

Each of the first baffle plate and the second baffle plate may further include a third mode operated to allow the inlet guides and the outlet guides to closely adhere to each other so that the first baffle plate and the second baffle plate are spaced apart in a facing direction.

Each of the first baffle plate and the second baffle plate may include an inlet port and an outlet port formed between the plurality of first guide units and the plurality of second guide units to allow an air current to flow in and out therethrough, and the path is formed to span from the inlet port to the outlet port.

According to yet another aspect of the present disclosure, a grease filter includes a first baffle plate having a plurality of first guide units, and a second baffle plate having a plurality of second guide units arranged alternately with the plurality of first guide units to form a path with the plurality of first guide units and arranged to face the first baffle plate. Here, the plurality of first guide units includes a plurality of first direction change guides formed to be curved at a lateral end of the second baffle plate, the plurality of second guide unit includes a plurality of second direction change guides formed to be curved at a lateral end of the first baffle plate, and the path includes a direction change path spanning between the plurality of first direction change guides and the plurality of second direction change guides; and a guide path bypassing the plurality of first direction change guides and the plurality of second direction change guides and spanning between the plurality of first guide units and the plurality of second guide unit.

BRIEF DESCRIPTION OF THE DRAWINGS

The patent or application file contains at least one drawing executed in color. Copies of this patent or patent application publication with color drawings will be provided by the Office upon request and payment of the necessary fee. These and/or other aspects of the disclosure will become apparent and more readily appreciated from the following description of the embodiments, taken in conjunction with the accompanying drawings of which.

DETAILED DESCRIPTION

Figure 1:
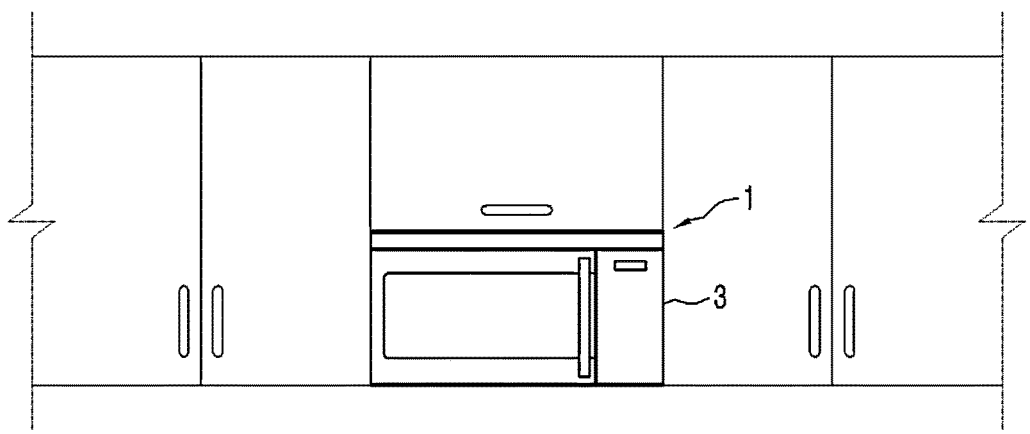
FIG. 1 is a diagram schematically showing the installation of a cooking device according to a first embodiment of the present disclosure.
Figure 1:
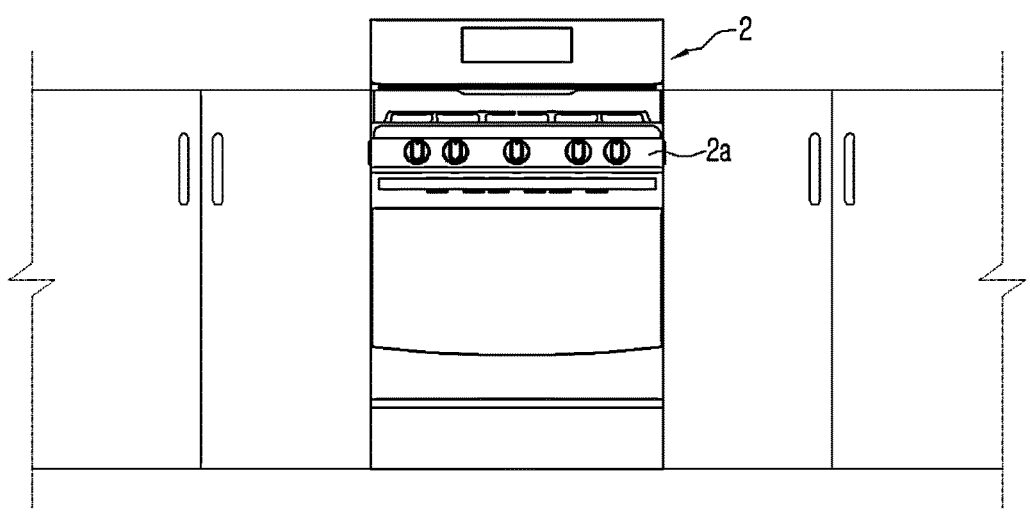

Reference will now be made in detail to the embodiments of the present disclosure, examples of which are illustrated in the accompanying drawings, wherein like reference numerals refer to like elements throughout.

Figure 2:
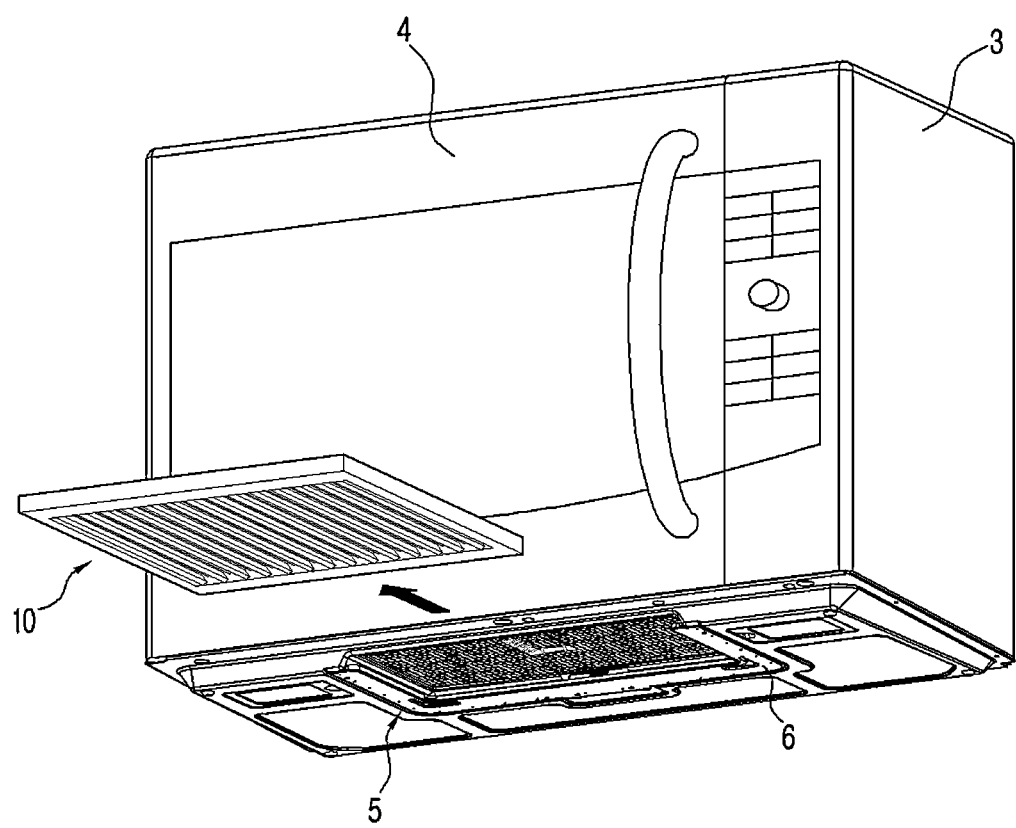
FIG. 2 is a perspective view schematically showing a cooking device provided with a grease filter according to a first embodiment of the present disclosure.

FIG. 1 is a diagram schematically showing the installation of a cooking device according to one embodiment of the present disclosure, and FIG. 2 is a perspective view schematically showing a cooking device provided with a grease filter according to one embodiment of the present disclosure.

As shown in FIGS. 1 and 2, a hood-combined microwave oven 1 (hereinafter referred to as a 'cooking device') according to this embodiment is installed above a cooking apparatus 2 used in a kitchen, such as an oven range or a gas range.

The cooking device 1 has typical functions of the microwave oven, and also serves to suck smoke generated in a process of cooking foods in the cooking apparatus 2 and discharge the smoke to the outside or purify smoke sucked through a filter and discharge the smoke indoors.

According to this embodiment, the cooking apparatus 2 is formed to have a flat upper surface, and thus a gas range 2a mounted on the cooking apparatus 2 is shown, but an electric range, or other apparatuses for heating and cooking food may be used herein The cooking device 1 may be configured to include a main body 3 forming the appearance thereof and a suction unit 5 provided at the bottom of the main body 3.

The main body 3 is formed so that a front surface of the main body 3 has an opening opened to accommodate dishes carrying food, and has a door 4 installed thereto to open and close the opening.

The suction unit 5 installed at the bottom of the main body 3 is provided to suck smoke generated in the cooking apparatus 2 mounted under the cooking device 1.

Although not shown, the main body 3 may be provided with a ventilation unit to suck polluted air, smoke or smells through the suction unit 5, and an exhaust duct or exhaust port to enable the flow of air sucked by the ventilation unit.

A large amount of oil particles generated upon cooking are included in polluting gases sucked through the suction unit 5 in this way.

A grease filter 10 is mounted to prevent such oil particles from accumulating in filters and ventilation paths.

The suction unit 5 may be formed at the bottom of the main body 3, and a bracket 6 may be provided to install the grease filter 10. According to this embodiment, a case in which the front surface of the bracket 6 is opened and slid to install the grease filter 10 into bracket 6 is shown in by way of example, but aspects of the present disclosure are not limited thereto. For example, the grease filter 10 may be detachably provided from a lower portion to an upper portion of the bracket 6 using separate coupling members such as screws.

The grease filter 10 may be installed at the suction unit 5 to pass the sucked polluted air, smoke or smells.

Figure 3:
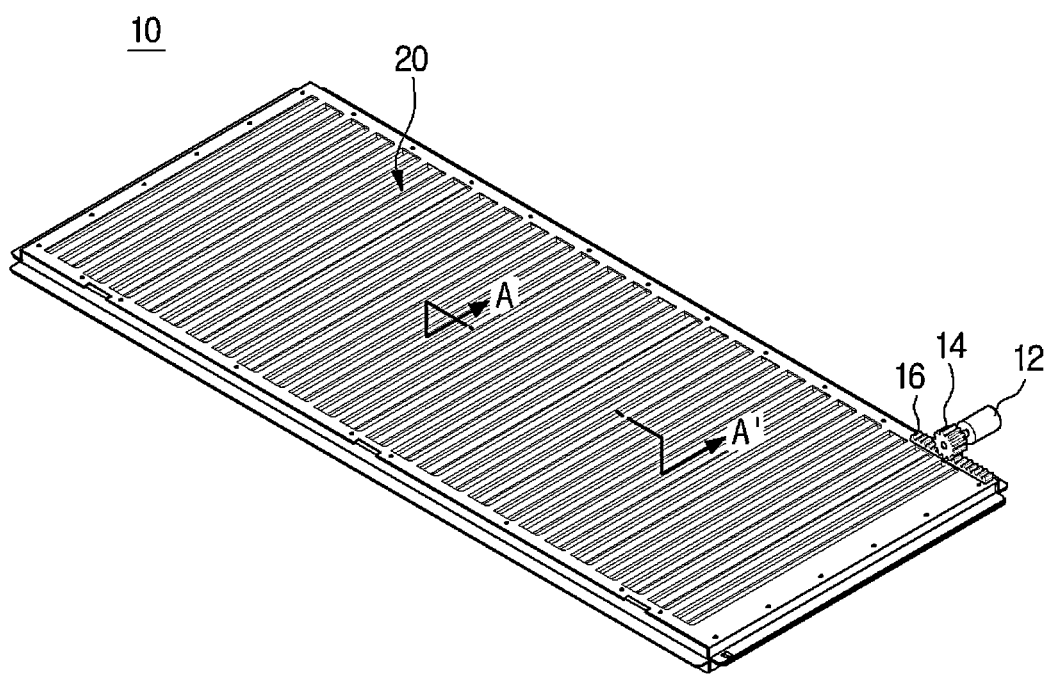
FIG. 3 is a perspective view of the grease filter according to the first embodiment of the present disclosure.
Figure 4:
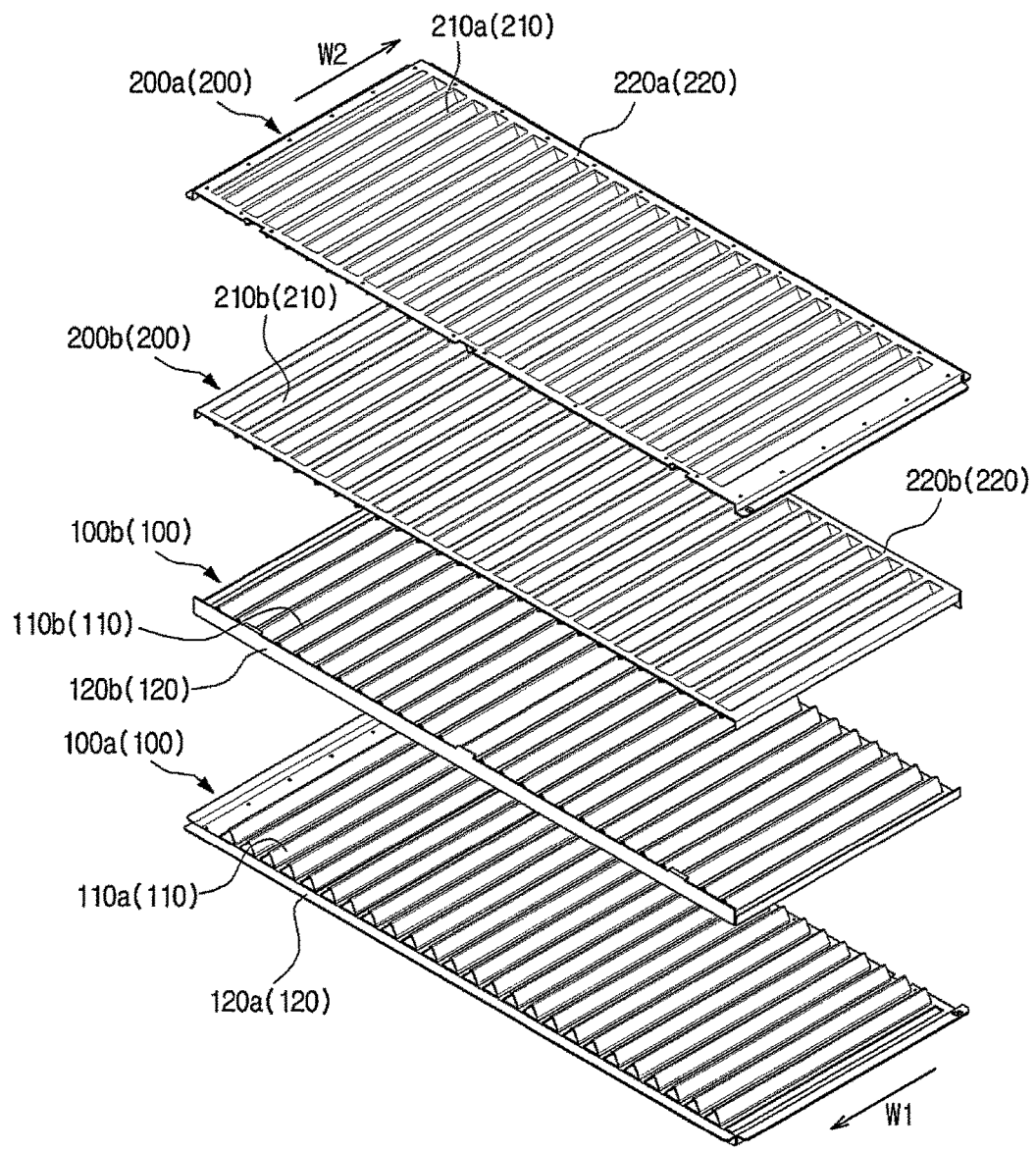
FIG. 4 is an exploded perspective view of the grease filter according to the first embodiment of the present disclosure.
Figure 5:
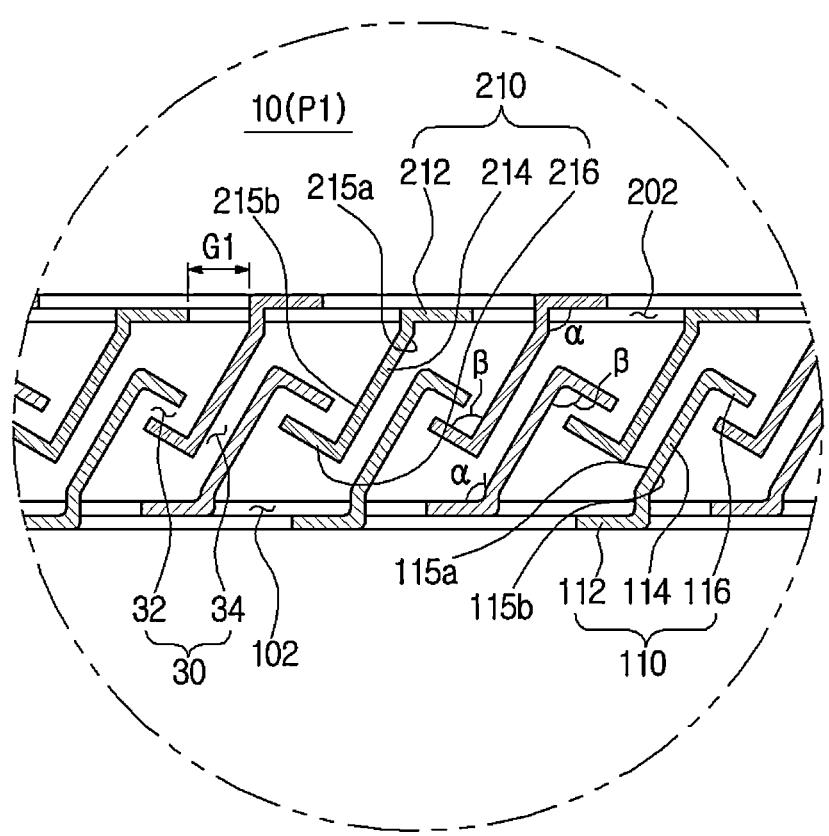
FIG. 5 is a cross-sectional view taken along line A-A' of FIG. 3.

FIG. 3 is a perspective view of a grease filter according to a first embodiment of the present disclosure, FIG. 4 is an exploded perspective view of the grease filter according to a first embodiment of the present disclosure, and FIG. 5 is a cross-sectional view taken along line A-A' of FIG. 3.

As described above, the grease filter 10 is provided to filter pollutants or air containing the oil particles.

The grease filter 10 may include a channel unit 20.

The channel unit 20 is provided to filter the oil particle or pollutants by interrupting the flow of air or colliding to the air. A material of the channel unit 20 is not limited, but, in this embodiment of the present disclosure, a material of a metal material is used for the channel unit 20. The grease filter 10 is generally provided to pass hot air therethrough, and thus may be formed of a metal material, thereby improving a flame retardant grade.

The channel unit 20 may include a first baffle plate 100 and a second baffle plate 200.

The first baffle plate 100 may be arranged upstream from the flow of air. The first baffle plate 100 may include an inlet portion 102 in an opening shape provided to allow oil particles to flow in therethrough, and a first guide unit 110 to guide an air current containing the oil particles flowing in through the inlet portion 102.

The second baffle plate 200 may be arranged downstream from the flow of air. The second baffle plate 200 may include an outlet portion 202 in an opening shape provided to discharge the air current containing the oil particles flowing in through the inlet portion 102 to the outside, and a second guide unit 210 to guide the air current so as to discharge the air current through the outlet portion 202.

The first baffle plate 100 and the second baffle plate 200 may be coupled to face each other. Also, the first baffle plate 100 and the second baffle plate 200 may be arranged so that the first guide unit 110 and the second guide unit 210 are arranged to cross each other. The first baffle plate 100 and the second baffle plate 200 may be provided with one or more first baffle plates 100a and 100b and one or more second baffle plates 200a and 200b, respectively.

The first baffle plate 100 and the second baffle plate 200 may be provided so that the first baffle plate 100 and the second baffle plate 200 are at least partially separated from each other in a direction parallel to the respective guide units 110 and 210, as will be described later. Also, the first baffle plate 100 and the second baffle plate 200 may be provided so that the first baffle plate 100 and the second baffle plate 200 are released in a direction perpendicular to the same plane.

The first guide unit 110 and the second guide unit 210 may guide the flow of air. The first guide unit 110 and the second guide unit 210 may be provided with one or more first guide units 110a and 110b and one or more second guide units 210a and 210b, respectively.

The first guide unit 110 may be formed in a first direction W1, and the second guide unit 210 may be formed in a second direction W2 that is a direction opposite to the first direction W1. The first baffle plate 100 and the second baffle plate 200 may be provided so that the first baffle plate 100 and the second baffle plate 200 are at least separated in the first direction W1 and the second direction W2, respectively.

The first baffle plate 100 and the second baffle plate 200 may further include a first frame 120 and a second frame 220, respectively, both of which are in a case shape, and at least ends of the first guide unit 110 and the second guide unit 210 may be fixed in the first frame 120 and the second frame 220, respectively. According to one embodiment of the present disclosure, the first guide unit 110 and the second guide unit 210 may be provided so that both ends of the first guide unit 110 and the second guide unit 210 are fixed in the first frame 120 and the second frame 220, respectively.

The first guide unit 110 may be provided at the first baffle plate 100 in a plural number, and the first guide units 110 may be provided side by side to be spaced apart at predetermined intervals. Also, the second guide unit 210 may be provided at the second baffle plate 200 in a plural number, and the second guide units 210 may be provided side by side to be spaced apart at predetermined intervals.

The coupling of the first baffle plate 100 to the second baffle plate 200 is not limited. According to one embodiment of the present disclosure, however, the first baffle plate 100 is coupled to the second baffle plate 200 so that the plurality of second guide units 210 are arranged between the plurality of respective first guide unit 110.

The shape of the first guide unit 110 is not limited. According to one embodiment of the present disclosure, however, the first guide unit 110 may be provided to have an S-letter shape.

The first guide unit 110 may include a first support unit 112, an inlet guide 114, and a first direction change guide 116.

The first support unit 112 may form the inlet portion 102 of the channel unit 20. Since the first support unit 112 may be provided in a plural number to be spaced apart at predetermined intervals, the plurality of first support units 112 may form the inlet portion 102, through which pollutants or air containing oil particles flow in, between the plurality of first support units 112.

The first support unit 112 may be provided so that at least one end of the first support unit 112 is supported by the first frame 120 to fix the first guide unit 110. According to one embodiment of the present disclosure, both ends of the first support unit 112 are supported by the first frame 120 to fix the first guide unit 110.

The inlet guide 114 is provided to filter some of pollutants or air containing oil particles flowing in through the inlet portion 102 while guiding the oil particles or pollutants into the channel unit 20. The inlet guide 114 may be provided to be curved and extend from the first support unit 112. The inlet guide 114 may be provided to be inclined obliquely toward the second baffle plate 200 so that the inlet guide 114 guides an air current flowing in through inlet portion 102.

The first direction change guide 116 is provided to filter the oil particles or pollutants by interrupting the flow of pollutants or air containing oil particles guided by the inlet guide 114 or colliding to the oil particles or pollutants. The first direction change guide 116 may be provided to be curved and extend from the inlet guide 114. More particularly, the first direction change guide 116 may be provided to be curved at a lateral end of the second baffle plate 200 of the first guide unit 110.

When it is assumed that an angle formed between the first support unit 112 and the inlet guide 114 is set to $\alpha$, $\alpha$ may be formed as an obtuse angle between greater than or equal to 90° and less than or equal to 180°. Also, when it is assumed that an angle formed between the inlet guide 114 and the first direction change guide 116 is set to $\beta$, $\beta$ may be formed as an obtuse angle between greater than or equal to 90° and less than or equal to 180°.

More particularly, the first support unit 112 may be provided to form an obtuse angle with a first inlet plane 115a that is one lateral plane of the first support unit 112 of the inlet guide 114, and the first direction change guide 116 may be provided to form an obtuse angle with a second inlet plane 115b that is the other lateral plane of the first inlet plane 115a. However, the angles $\alpha$ and $\beta$ are not limited, and may be formed as an acute angle or a right angle.

The shape of the second guide unit 210 is not limited. According to one embodiment of the present disclosure, the second guide unit 210 may be provided to have an S-letter shape.

The second guide unit 210 may include a second support unit 212, an outlet guide 214, and a second direction change guide 216.

The second support unit 212 may form the outlet portion 202 of the channel unit 20. Since the second support unit 212 may be provided in a plural number to be spaced apart at predetermined intervals, the plurality of second support units may form the outlet portion 202, through which the pollutants or air containing oil particles partially filtered through the channel unit 20 are discharged, between the plurality of second support unit 212.

The second support unit 212 may be provided so that at least one end of the second support unit 212 is supported by the first frame 120 to fix the first guide unit 110. According to one embodiment of the present disclosure, both ends of the second support unit 212 are supported by the second frame 22 to fix the second guide unit 210.

The outlet guide 214 is provided to filter some of the pollutants or air containing oil particles discharged through the outlet portion 202 while guiding the oil particles or pollutants into the channel unit 20. The outlet guide 214 may be provided to be curved and extend from the second support unit 212. The outlet guide 214 may be provided to be inclined obliquely toward the first baffle plate 100 to guide the air current discharged through the outlet portion 202.

The second direction change guide 216 is provided to filter the oil particles or pollutants by interrupting the flow of the pollutants or air containing oil particles or colliding to the oil particles or pollutants. The second direction change guide 216 may be provided to be curved and extend from the outlet guide 214. Specifically, the second direction change guide 216 may be provided to be curved at a lateral end of the second baffle plate 200 of the second guide unit 210.

When it is assumed that an angle formed between the second support unit 212 and the outlet guide 214 is set to α, α may be formed as an obtuse angle between greater than or equal to 90° and less than or equal to 180°. Also, when it is assumed that an angle formed between the outlet guide 214 and the second direction change guide 216 is set to β, β may be formed as an obtuse angle between greater than or equal to 90° and less than or equal to 180°.

Specifically, the second support unit 212 may be provided to form an obtuse angle with a second outlet surface 215a that is one lateral surface of the second support unit 212 of the outlet guide 214, and the second direction change guide 216 may be provided to form an obtuse angle with a second outlet surface 215b that is a surface opposite to the second outlet surface 215a. However, the angles α and β are not limited, and may be formed as an acute angle or a right angle.

The first direction change guide 116 and the second direction change guide 216 may be formed to face each other, and may also be arranged spaced apart with each other. As the first direction change guide 116 and the second direction change guide 216 are spaced apart with each other, a direction change path 32 to be described later may be formed between the first direction change guide 116 and the second direction change guide 216. The inlet guide 114 and the outlet guide 214 may be arranged side by side with each other. The inlet guide 114 and the outlet guide 214 may form a guide path 34 to be described later.

The first guide unit 110 and the second guide unit 210 may not be the same. According to one embodiment of the present disclosure, however, the first guide unit 110 and the second guide unit 210 may be provided to have the same shape, and provided so that the first guide unit 110 and the second guide unit 210 can be symmetrical for a point at an angle of 180°. When this is explained in view of a different point of view, the at least one first guide unit 110 and the at least one second guide unit 210 may include a plurality of first guide units 110 and a plurality of second guide units 210, respectively. In this case, the plurality of first guide units 110 and the plurality of second guide units 210 may be alternately arranged. That is, the plurality of first guide units 110 and the plurality of second guide units 210 may be arranged to cross each other. Each of the plurality of first guide units 110 and the plurality of second guide units 210 arranged thus may be arranged spaced apart at predetermined intervals.

The channel unit 20 may include a path 30 through pollutants or air containing oil particles float.

The path 30 may be formed by the first baffle plate 100 and the second baffle plate 200.

The path 30 may include a direction change path 32 formed to span between the first direction change guide 116 and the second direction change guide 216, and a guide path 34 bypassing the first direction change guide 116 and the second direction change guide 216 and formed between the inlet guide 114 and the outlet guide 214.

The air containing the oil particles or the pollutants flowing in through the inlet portion 102 may be passed through the direction change path 32 or the guide path 34, and discharged through the outlet portion 202.

The guide path 34 may be provided so that the guide path 34 has a longer path length than the direction change path 32. That is, as the direction change path 32 is formed to have a longer course than the guide path 34, the oil particles included in the air current passing through the direction change path 32 may be collected at a larger amount than the air current passing through the guide path 34.

For the path 30 spanning from the inlet portion 102 to the outlet portion 202, the collection efficiency of the oil particles or pollutants may be further improved as the number of guides forming the path 30 increases, but flow noise or vibration noise may get loud due to a significant pressure drop of an air current caused by the pollutants or air containing the oil particles. On the other hand, the flow or vibration noise may be reduced as the number of the guides forming the path 30 decreases, but the collection efficiency of the oil particles or pollutants may be lowered.

According to one embodiment of the present disclosure, since the oil particles or pollutants pass through the direction change path 32 provided to interrupt the flow of an air current or collide to the air current while making a change of direction, and the guide path 34 formed so that the path 30 has a longer length than the direction change path 32 without making a change of direction, the pressure drop may be decreased, and the collection efficiency may be improved.

Figure 6:
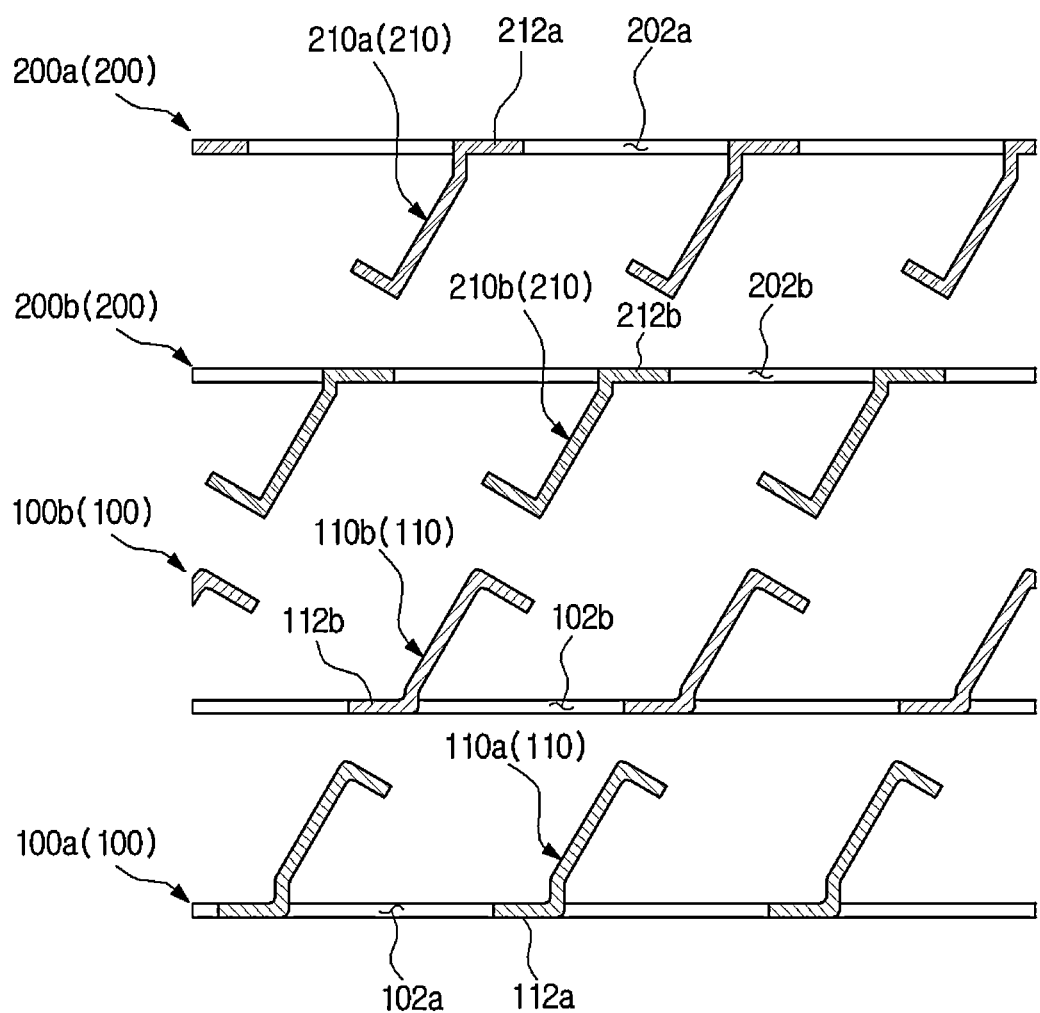
FIG. 6 is a diagram showing the disassembly of the grease filter according to the first embodiment of the present disclosure.

FIG. 6 is a diagram showing the disassembly of the grease filter according to the first embodiment of the present disclosure.

As shown in FIG. 6, each of the first baffle plate 100 and the second baffle plate 200 may be provided in a plural number. The plurality of first baffle plates 100a and 100b and the plurality of second baffle plates 200a and 200b may be formed to overlap with each other to narrow the gaps between the plurality of first guide units 110a and 110b and the plurality of second guide units 210a and 210b, thereby improving the collection efficiency.

Also, since the durability of the air current against a pressure may be improved by narrowing the gaps between the plurality of first guide units 110a and 110b and the plurality of second guide units 210a and 210b, the guide units 110a, 110b, 210a and 210b may be manufactured in a small thickness, thereby cutting the manufacturing costs.

A gap between one of the plurality of first guide units 110a and 110b and the other first guide unit may be referred to as a guide gap G1. In this case, the plurality of first baffle plates 100a and 100b may be coupled to overlap each other so that the first guide unit 110a of one of the plurality of first baffle plates 100a and 100b is arranged between other guide gaps G1. In the case of the second baffle plates 200a and 200b, the same can be applied thereto.

When this is explained in view of a different point of view, the plurality of first baffle plates 100a and 100b may be provided to overlap each other so that an first support unit 112b of one of the plurality of first baffle plates 100a and 100b is arranged on an inlet portion 102a of another of the plurality of first baffle plates 100*a* and 100*b*, and the second baffle plates 200 may be provided to overlap each other so that the second support unit 212*b* of one second baffle plate 200*b* of the plurality of second baffle plates 200*a* and 200*b* is arranged on the outlet portion 202*a* of the other second baffle plate 200*a* of the plurality of second baffle plates 200*a* and 200*b*, and vice versa.

This is explained in view of a different point of view. The plurality of first baffle plates 100*a* and 100*b* are provided to be stacked so that the guide unit 110*a* of one first baffle plate 100*a* of the plurality of first baffle plates 100*a* and 100*b* is arranged on the path 30 of the other first baffle plate 100*b*. Through such a configuration, the guide unit 110*a* of the one first baffle plate 100*a* may be arranged side by side with the guide unit 110*b* of the other first baffle plate 100*b*. Although the plurality of first baffle plates 100*a* and 100*b* have been described, the plurality of second baffle plates 200*a* and 200*b* may also be applicable in the same manner. The plurality of first baffle plates 100*a* and 100*b* and the plurality of second baffle plates 200*a* and 200*b* stacked thus may be arranged to alternate the plurality of first guide units 110*a* and 110*b* and the plurality of second guide units 210*a* and 210*b*. Since the plurality of first baffle plates 100*a* and 100*b* move in a first direction W1, and the plurality of second baffle plates 200*a* and 200*b* move in a second direction W2, the plurality of first baffle plates and the plurality of second baffle plates may be provided so that the plurality of first baffle plates and the plurality of second baffle plates are at least partially spaced apart with each other.

Also, each of the plurality of first baffle plates 100*a* and 100*b* may include a first stopper, and each of the plurality of second baffle plates 200*a* and 200*b* may include a second stopper. Thus, the first stopper and the second stopper may be provided to limit the relative movement of the plurality of first baffle plates 100*a* and 100*b* and the plurality of second baffle plates 200*a* and 200*b* within predetermined bounds. When the plurality of first baffle plates 100*a* and 100*b* and the plurality of second baffle plates 200*a* and 200*b* move in a direction in which the plurality of first baffle plates 100*a* and 100*b* and the plurality of second baffle plates 200*a* and 200*b* are separated from each other, the first stopper and the second stopper are formed to come in contact with each other, thereby limiting the separation bounds. The first baffle plate 100 and the second baffle plate 200 may be completely separated as in a separation method of FIG. 8 to be described later, but the first baffle plate 100 and the second baffle plate 200 may be provided with the stopper so that the first baffle plate 100 and the second baffle plate 200 are separated only within predetermined bounds, as in a separation method of FIG. 9A.

Reference numerals 120*a* and 120*b*, and 220*a* and 220*b* not shown herein represent a plurality of first frames 120*a* and 120*b*, and a plurality of second frames 220*a* and 220*b*, respectively. Also, reference numerals 102*b*, 112*a*, 202*b* and 212*a* represent an inlet portion 102*b*, a first support unit 112*a*, an outlet portion 202*b*, and a second support unit 212*b*.

Although a case in which the two first baffle plates 100 and the two second baffle plates 200 are provided is described above for the sake of convenience of description, but the first baffle plate 100 and the second baffle plate 200 may be provided in two or more numbers.

Figure 7:
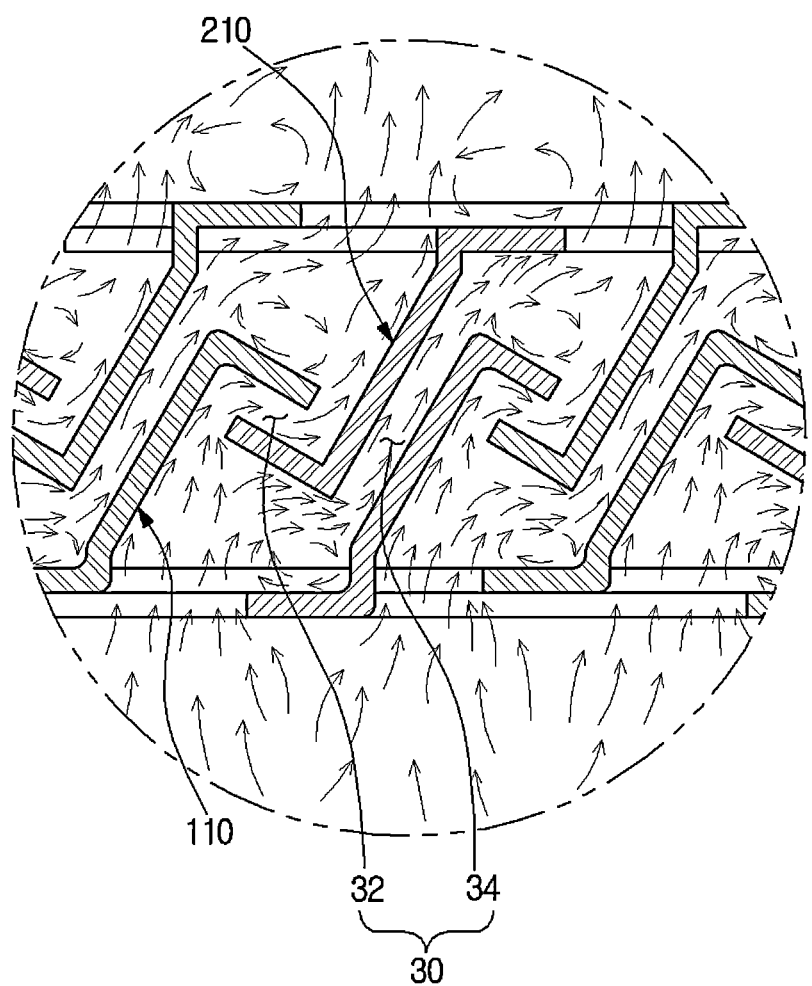
FIG. 7 is a diagram showing the flow of an air current including oil particles passing through the grease filter according to the first embodiment of the present disclosure.

FIG. 7 is a diagram showing the flow of pollutants or an air current including oil particles passing through the grease filter according to the first embodiment of the present disclosure.

As shown in FIG. 7, the pollutants or the air containing oil particles collide to a plane of each of the first baffle plate 100 and the second baffle plate 200 while passing through the grease filter 10. At the same time, the oil particles or pollutants may be filtered through the grease filter 10.

The plurality of first support units 112 function to fix the first guide unit 110 of the first baffle plate 100, and also function to disperse the air flowing in through the grease filter 10 through the plurality of inlet portions 102.

The air passing through the inlet portion 102 may dividedly flow through the direction change path 32 and the guide path 34.

The air flowing in through the direction change path 32 may be passed through the inlet guide 114, the first direction change guide 116, the second direction change guide 216, and the outlet guide 214, and then discharged to the outside through the outlet portion 202.

The air flowing in through the guide path 34 may be passed through the inlet guide 114, the outlet guide 214, and the second support unit 212, and then discharged to the outside through the outlet portion 202.

The direction change path 32 has improved collection efficiency since the flow of an air current from the inlet portion 102 and the flow of air flowing through the guide path 34 formed to be cured are achieved at a higher level than the collision of the air current, and the guide path 34 has improved collection efficiency since the guide path 34 has a smaller area colliding to the air than the direction change path 32, but is formed to have a larger length than the direction change path 32.

As a result, the collection efficiency may be improved, and vibrations and noise caused by the pressure drop may be prevented.

Figure 8:
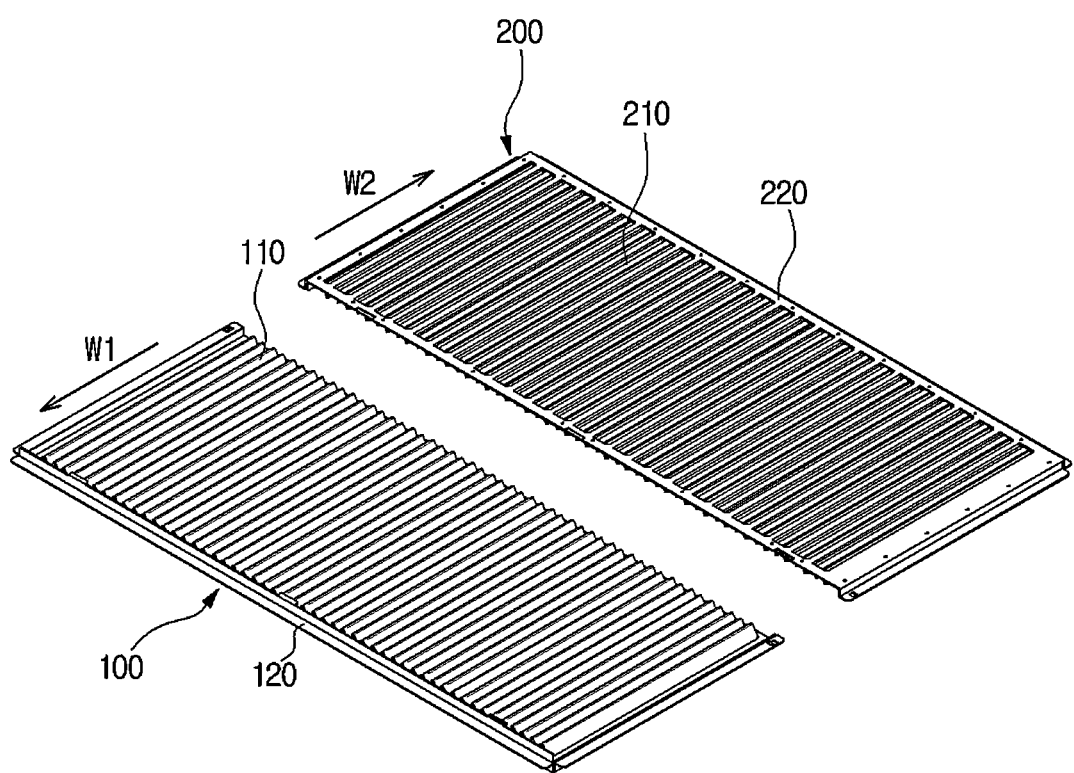
FIG. 8 is a diagram showing the separation of the grease filter according to the first embodiment of the present disclosure.
Figure 9A:
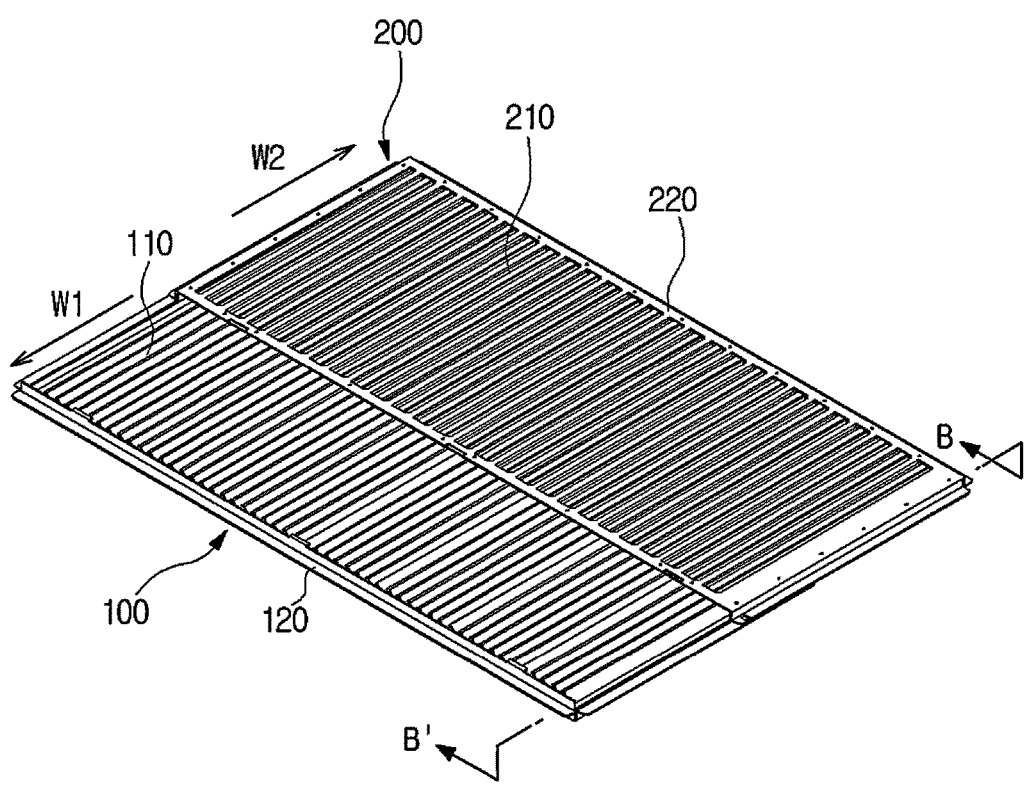
FIG. 9A is a diagram showing the separation of the grease filter according to the first embodiment of the present disclosure.
Figure 9B:
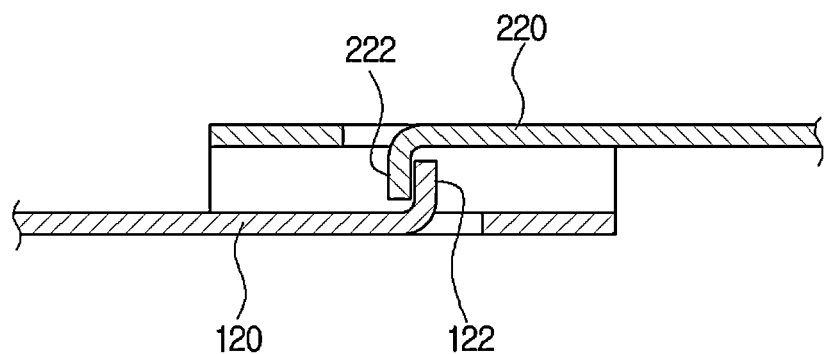
FIG. 9B is a cross-sectional view taken along line B-B' of FIG. 9A.
Figure 10A:
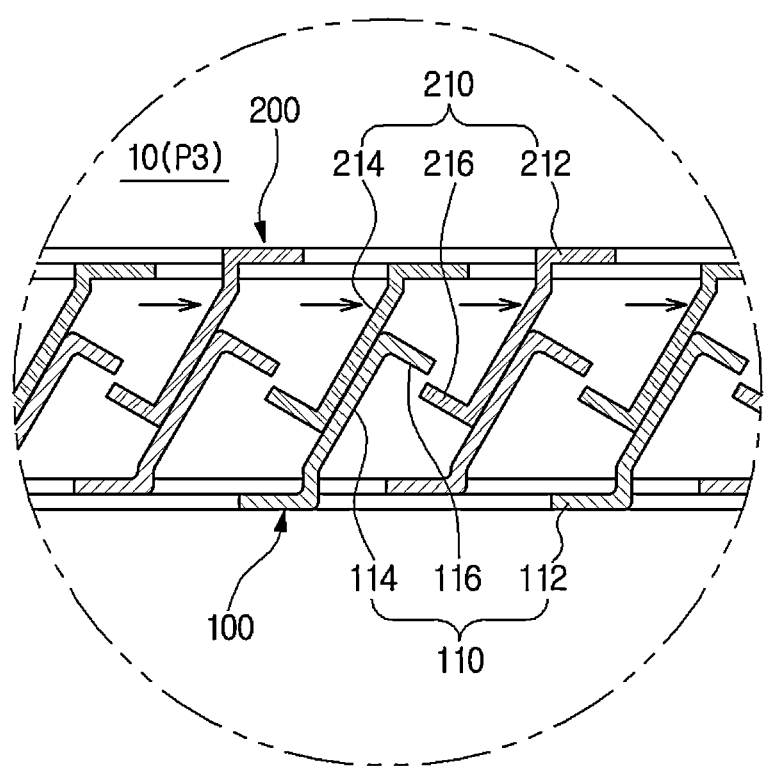
FIGS. 10A and 10B are diagrams showing the separation of the grease filter according to the first embodiment of the present disclosure.
Figure 10B:
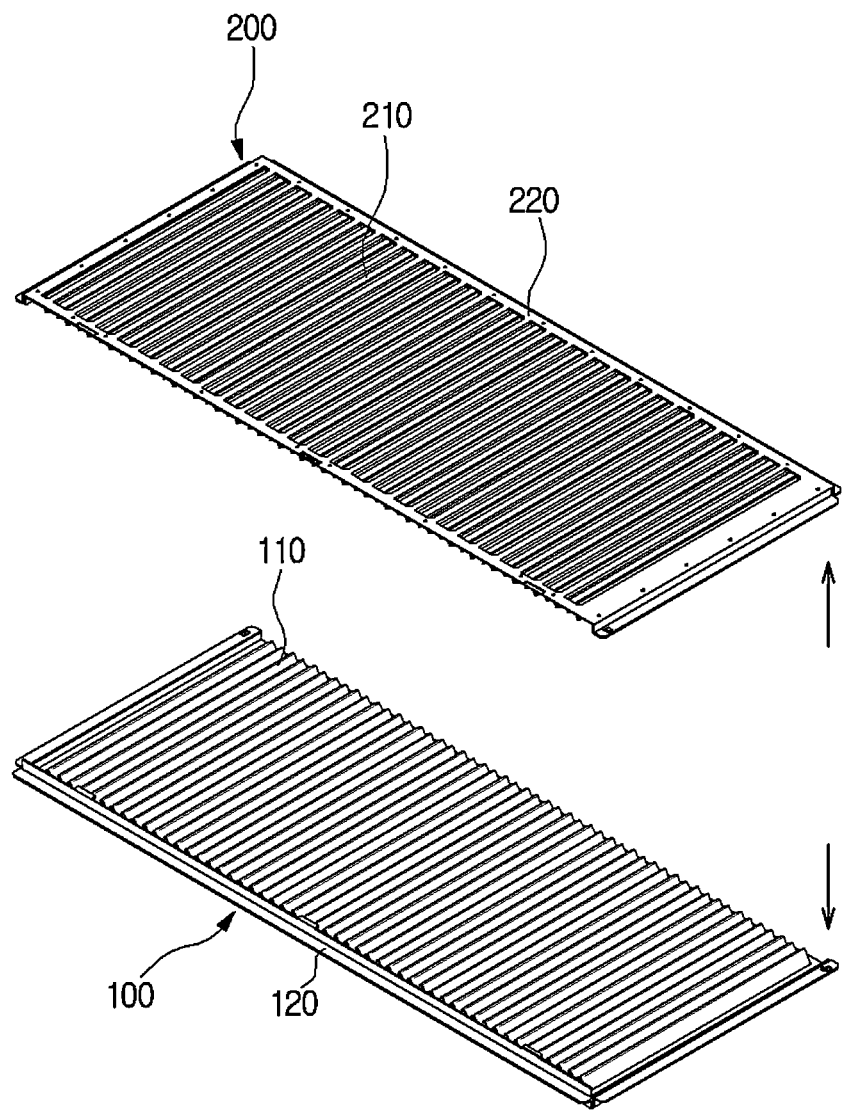

FIG. 8 is a diagram showing the separation of the grease filter according to the first embodiment of the present disclosure, FIG. 9A is a diagram showing the separation of the grease filter according to the first embodiment of the present disclosure, FIG. 9B is a cross-sectional view taken along line B-B' of FIG. 9A, and FIGS. 10A and 10B are diagrams showing the separation of the grease filter according to the first embodiment of the present disclosure.

FIG. 8 shows a first method of separating the grease filter according to the first embodiment of the present disclosure. The first baffle plate 100 and the second baffle plate 200 may be arranged upstream and downstream of an air flow phase, respectively, and thus may be detachably provided.

Specifically, the first guide unit 110 may be formed in a first direction W1, and the second guide unit 210 may be formed in a second direction W2 opposite to the first direction W1. In this case, the first baffle plate 100 and the second baffle plate 200 may be provided to be separable in the first direction W1 and the second direction W2, respectively.

FIG. 9A is a diagram showing the separation of the grease filter according to the first embodiment of the present disclosure, and FIG. 9B is a cross-sectional view taken along line B-B' of FIG. 9A. The first baffle plate 100 and the second baffle plate 200 may be provided to be completely separable, but may also be provided to be completely separable only within predetermined bounds.

Specifically, a stopper to limit a movement of the first baffle plate 100 and the second baffle plate 200 beyond predetermined bounds may be provided at each of the first baffle plate 100 and the second baffle plate 200. The stopper includes a first stopper 122 provided at the first baffle plate 100, and a second stopper 222 provided at the second baffle plate 200. Here, the first stopper 122 and the second stopper 222 may be provided to correspond to each other, and thus may be arranged, respectively, on the first baffle plate 100 and the second baffle plate 200 upon the separation of the first baffle plate 100 and the second baffle plate 200 to limit the separation of the first baffle plate 100 and the second baffle plate 200 beyond the predetermined bounds.

The arrangements of the first stopper 122 and the second stopper 222 are not limited. According to one embodiment of the present disclosure, however, the first stopper 122 and the second stopper 222 may be arranged on a first frame 120 and a second frame 220 to be described later so as to interrupt the flow of air.

FIGS. 10A and 10B show a third method of separating the grease filter according to the first embodiment of the present disclosure.

The first baffle plate 100 and the second baffle plate 200 may be provided to be separable in the first direction W1 and the second direction W2, respectively, but may be separated in a direction opposite to the facing direction.

The first guide unit 110 may be provided in a plural number. In this case, a gap between one of the plurality of first guide units 110 and another first guide unit adjacent to the one first guide unit is referred to as a guide gap G1.

As shown in FIG. 10A, the first baffle plate 100 coupled to the second baffle plate 200 moves within the guide gap G1. This is to allow the unit of first direction change guides 116 and the unit of second direction change guides 216 to move so that the unit of first direction change guides 116 and the unit of second direction change guides 216 do not overlap each other in a vertical direction.

In a state in which the unit of first direction change guides 116 and the unit of second direction change guides 216 do not overlap each other in a vertical direction, the first baffle plate 100 and the second baffle plate 200 may be separated from each other when the first baffle plate 100 and the second baffle plate 200 are spaced apart in a direction opposite to the facing direction, that is, a vertical direction relative to the first baffle plate 100 and the second baffle plate 200, as shown in FIG. 10B.

When the first baffle plate 100 and the second baffle plate 200 are provided to be separable as described above, the oil particles and pollutants accumulated between the guides forming the path 30 may be easily removed, thereby maintaining collection efficiency and semi-permanently employing the grease filter 10.

By way of example, although some cases of separation of the grease filter 10 are as described above, but the present disclosure is not limited thereto. For example, the first baffle plate 100 and the second baffle plate 200 may be configured to be separable from each other.

Figure 11:
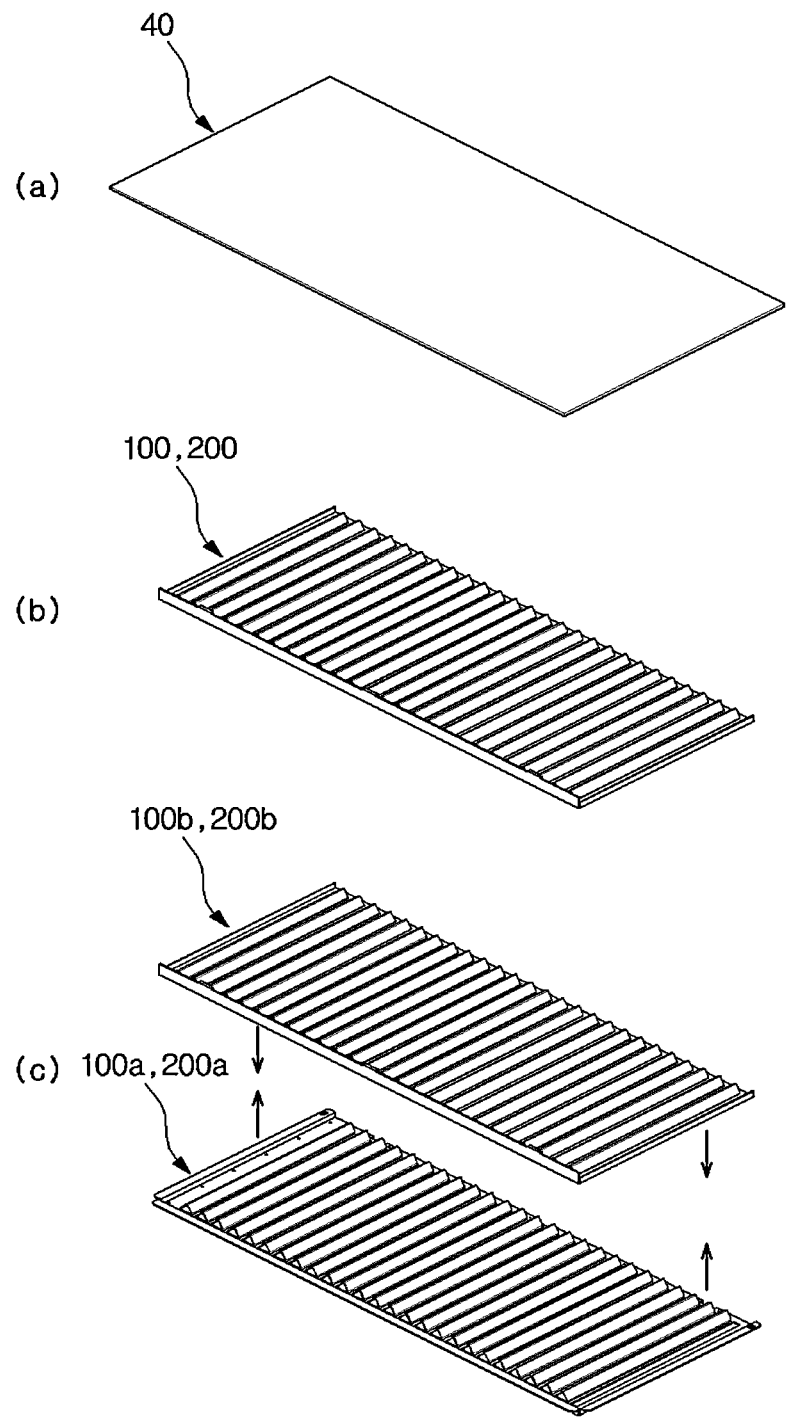
FIG. 11, parts (a)-(c), is a diagram showing the manufacture of the grease filter according to the first embodiment of the present disclosure.

FIG. 11, parts (a)-(c), is a diagram showing the manufacture of the grease filter according to the first embodiment of the present disclosure.

As shown in FIG. 11, part (a), at least one plate 40 formed of a metal material is provided. The first baffle plate 100 or second baffle plate 200 is formed by press-processing the plate 40, as shown in FIG. 11, part (b).

Using this process, the first frame 120 and the second frame 220 are configured to be formed integrally with the first guide unit 110 and the second guide unit 210, respectively. In this case, at least some of the first guide unit 110 and the second guide unit 210 are provided to be spaced apart from the first frame 120 and the second frame 220, respectively.

That is, the inlet guide 114 and the unit of first direction change guides 116 are provided to be spaced apart from the first frame 120 by means of press processing, and the outlet guide 214 and the unit of second direction change guides 216 are provided to be spaced apart from the second frame 220 by means of press processing.

As the first and second guide units 110 and 210 are formed at the first baffle plate 100 and the second baffle plate 200, respectively, by means of press forming, openings such as an inlet portion 102 and an outlet portion 202 corresponding to the first and second guide units 110 and 210 are formed. Therefore, the first and second guide units 110 and 210 may be formed so that the first and second guide units 110 and 210 have the same width as the inlet portion 102 and the outlet portion 202.

As shown in FIG. 11, part (c), the first baffle plate 100 and the second baffle plate 200 formed by the press processing may be provided in plural numbers, and thus may be formed to overlap each other in a vertical direction. That is, the plurality of first baffle plates 100 may be provided to be coupled to each other to overlap, and the plurality of second baffle plates 200 may also be provided in the same manner as in the plurality of first baffle plates 100.

When it is assumed that the first guide unit 110 and the second guide unit 210 are provided at the first baffle plate 100 and the second baffle plate 200 in the first direction W1 and the first direction W1, respectively, the first baffle plate 100 and the second baffle plate 200 may be detachably coupled in the first direction W1 and the second direction W2, respectively.

That is, the first baffle plate 100 and the second baffle plate 200 may be coupled to each other by press fitting so that the first guide unit 110 and the second guide unit 210 overlap each other while forming the path 30.

In the description, the first baffle plate 100, the first frame 120, the first guide unit 110, the first support unit 112, the first direction change guide 116, the second baffle plate 200, the second frame 220, the second guide unit 210, the second support unit 212, and the second direction change guide 216 may be used interchangeably with an upper channel, an upper frame, an upper guide unit, an upper support unit, an upper direction change guide, a lower channel, a lower frame, a lower guide unit, a lower support unit, and a lower direction change guide, respectively.

Hereinafter, a grease filter according to a first embodiment, and control of the cooking device having the same will be described in detail.

Figure 12:
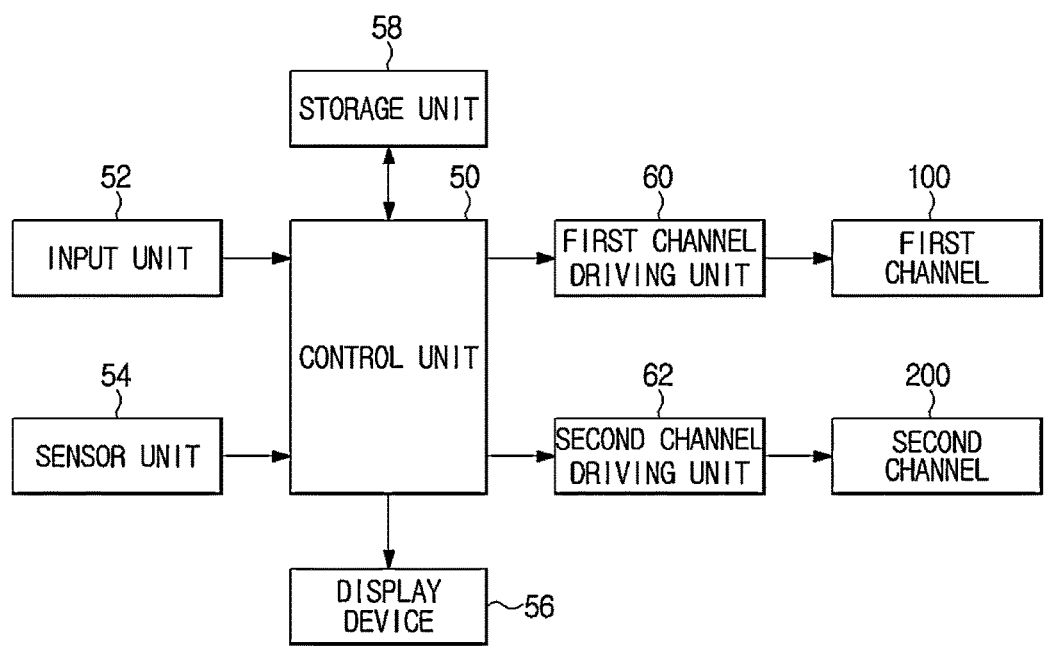
FIG. 12 is a block diagram showing the control of the grease filter according to the first embodiment of the present disclosure.

FIG. 12 is a block diagram showing the control of the grease filter according to the first embodiment of the present disclosure.

The grease filter and the cooking device having the same may include a control unit 50, an input unit 52, a sensor unit 54, a display device 56, a storage unit 58, a first baffle plate driving unit 60, and a second baffle plate driving unit 62.

The input unit 52 may include a power button to drive the grease filter 10, and the like. The input unit 52 may be provided with a push switch to sense an application of pressure by a user, a membrane switch, or a touch switch to sense some contact by a user.

The sensor unit 54 is provided to sense generation of oil particles when the oil particle generated during a cooking process using a cooking device, and an air current flows in the grease filter 10. More particularly, the sensor unit 54 senses a degree of generation of the oil particles, the temperature of the oil particles, the temperature of the air current, or the like, and inputs such information into the control unit 50.

The control unit 50 performs operations to control the first baffle plate driving unit 60 and the second baffle plate driving unit 62, based on commands or information input through the input unit 52 and the sensor unit 54. The control unit 50 may be provided to directly receive the commands through the input unit 52 to perform the operations, and may also be provided to perform the operations when some requirements are satisfied based on the information input through the sensor unit 54. More particularly, the control unit 50 may instruct a filtering mode P1, a ventilation mode P2, and a release mode P3 through the input unit 52, and thus may perform the operations so as to execute the corresponding commands. After the control unit 50 performs the operations, the control unit 50 sends operating signals corresponding to the corresponding commands to the first baffle plate driving unit 60 and the second baffle plate driving unit 62 as will be described later.

The display device 56 displays information on the grease filter to correspond to the control commands input by a user. For example, the display device 56 may display an operation state of the grease filter.

A light emitting diode (LED) and an organic light emitting diode (OLED), both of which emit light autonomously, or a liquid crystal display device 56 provided with a separate light source may be used as the display device 56.

Although not shown in the drawings, the display device 56 may include a touch screen panel (TSP) to receive control commands from a user through the input unit 52 and display operation information corresponding to the control commands input through the input unit 52 according to embodiments of the present disclosure.

The touch screen panel may include a display device 56 to display operation information and control commands which may be input by a user, a touch panel to detect the coordinates of a position with which a body part of the user comes contact, and a touch screen controller to judge the control commands input by the user, based on the contact coordinates detected by the touch panel.

The storage unit 58 is provided to interact with the control unit 50. When the information obtained from the sensor unit 54 in input into the control unit 50 to judge whether some requirements are satisfied, the storage unit 58 is provided to store the predetermined parameters corresponding to the information.

The first baffle plate driving unit 60 and the second baffle plate driving unit 62 are provided to drive the first baffle plate 100 and the second baffle plate 200, based on the operating signals received from the control unit 50.

The first baffle plate driving unit 60 and the second baffle plate driving unit 62 satisfy the predetermined parameters as long as they are configured to enable movements of the first baffle plate 100 and the second baffle plate 200. According to this embodiment, the first embodiment is configured to drive the first baffle plate 100 and the second baffle plate 200 using a motor 12, and a pinion gear 14 and a rack gear 16 which are driven in engagement with rotation of the motor 12.

Specifically, the pinion gear 14 rotates with rotation of the motor 12, and a rotary motion of the pinion gear 14 is converted into a rectilinear motion of the rack gear 16 as the pinion gear 14 and the rack gear 16 are driven while being engaged with each other. The rack gear 16 is provided to be coupled to the first baffle plate 100 or the second baffle plate 200, so that the first baffle plate 100 and the second baffle plate 200 are driven in a rectilinear motion. Thus, the first baffle plate 100 and the second baffle plate 200 are provided to execute a filtering mode P1, a ventilation mode P2 and a release mode P3 as will be described later.

The embodiments of the first baffle plate driving unit 60 and the second baffle plate driving unit 62 are not limited.

The first baffle plate driving unit 60 and the second baffle plate driving unit 62 satisfy the predetermined parameters as long as they are configured to enable movements of the first baffle plate and the second baffle plate.

Hereinafter, a grease filter according to the first embodiment of the present disclosure, and an operating mode of the cooking device having the same will be described in detail.

The grease filter may include a filtering mode P1, a ventilation mode P2, and a release mode P3.

The filtering mode P1 is an operating mode in which the first baffle plate 100 and the second baffle plate 200 are arranged to enable the flow of an air current through the direction change path 32 and the guide path 34. In this case, the arrangement of the first baffle plate 100 and the second baffle plate 200 is the same as shown in FIG. 5. In the filtering mode P1, the direction change path 32 and the guide path 34 are provided to collect the oil particles while allowing the air current containing the oil particles to flow through both of the direction change path 32 and the guide path 34. In the filtering mode P1, the first baffle plate 100 and the second baffle plate 200 are arranged so that the plurality of first guide units 110 and the plurality of second guide units 210 are spaced apart.

Figure 13:
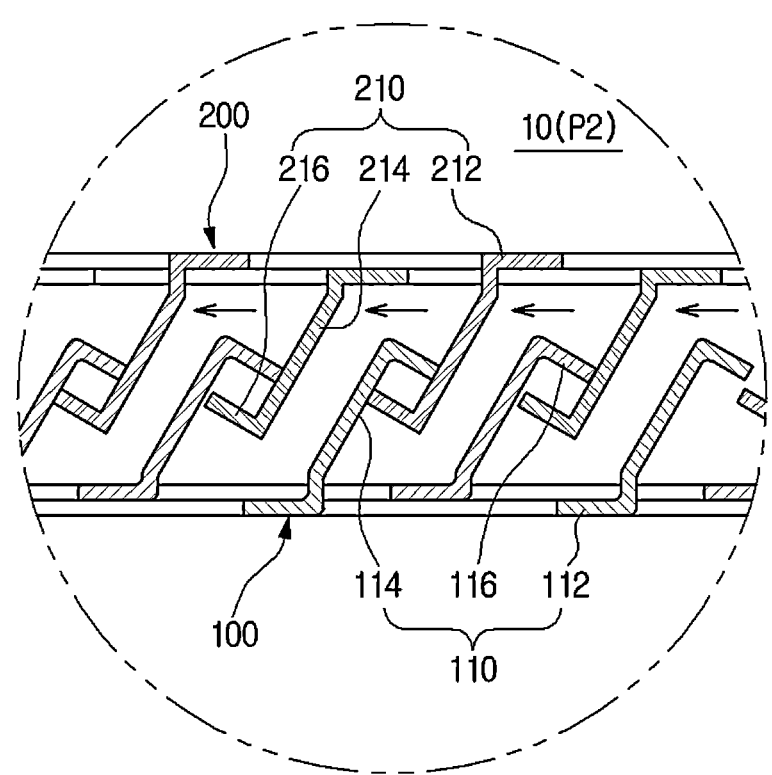
FIG. 13 is a diagram showing a ventilation mode of the grease filter according to the first embodiment of the present disclosure.

The ventilation mode P2 is an operating mode in which the first baffle plate 100 and the second baffle plate 200 are arranged to allow the first direction change guide 116 and the second direction change guide 216 to closely adhere to each other in order to close the direction change path 32. FIG. 13 is a diagram showing the ventilation mode of the grease filter according to the first embodiment of the present disclosure. The arrangement of the first baffle plate 100 and the second baffle plate 200 is the same as shown in FIG. 13. In the ventilation mode P2, since the air current flows only through the guide path 34 having a smaller contact area with channels than the direction change path 32, the pressure drop of the air current may be low, and a larger amount of the air current may flow, compared to the filtering mode P1. That is, in the ventilation mode P2, the first baffle plate 100 and the second baffle plate 200 are arranged so that the direction change path 32 can have a narrower width than the guide path 34, compared to the filtering mode P1. In the ventilation mode P2, the first baffle plate 100 and the second baffle plate 200 are arranged so that the plurality of first guide units 110 and the plurality of second guide units 210 closely adhere to each other. More particularly, the first baffle plate 100 and the second baffle plate 200 are arranged so that the first direction change guide 116 and the second direction change guide 216 closely adhere to each other, as described above.

The release mode P3 is an operating mode in which the inlet guide 114 and the outlet guide 214 are arranged so that the first baffle plate 100 and the second baffle plate 200 are spaced apart in a facing direction. That is, the first baffle plate 100 and the second baffle plate 200 are driven in a direction opposite to the direction from the filtering mode P1 to the ventilation mode P2. The arrangement of the first baffle plate 100 and the second baffle plate 200 is the same as shown in FIG. 10A. In the release mode P3, as the inlet guide 114 and the outlet guide 214 adhere to each other and the first direction change guide 116 and the second direction change guide 216 are spaced apart from each other, the first baffle plate 100 and the second baffle plate 200 are provided to be released in a direction perpendicular to the same surface.

The filtering mode P1, the ventilation mode P2 and the release mode P3 may be designated as a first mode, a second mode, and a third mode, respectively. However, the first mode, the second mode, and the third mode are designated for the sake of convenience, and thus may be designated interchangeably, when necessary.

Hereinafter, a grease filter according to a second embodiment of the present disclosure, and a manufacturing method thereof, and a cooking device having the same will be described in detail.

In the description, when the configuration of this embodiment overlaps the configurations of the embodiments, a detailed description thereof is omitted for clarity.

Figure 14:
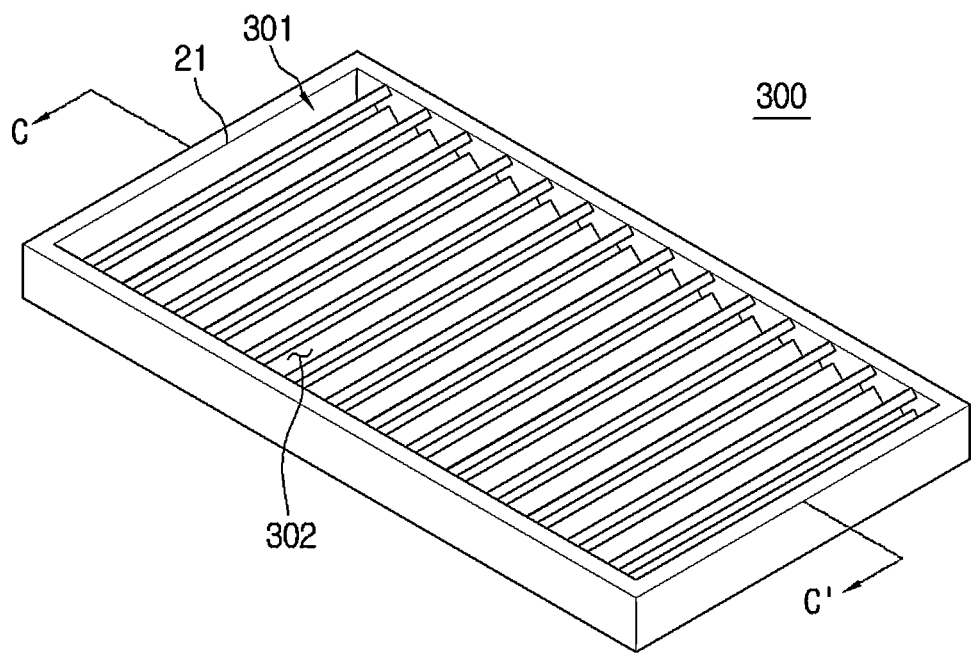
FIG. 14 is a perspective view schematically showing a grease filter according to a second embodiment of the present disclosure.
Figure 15:
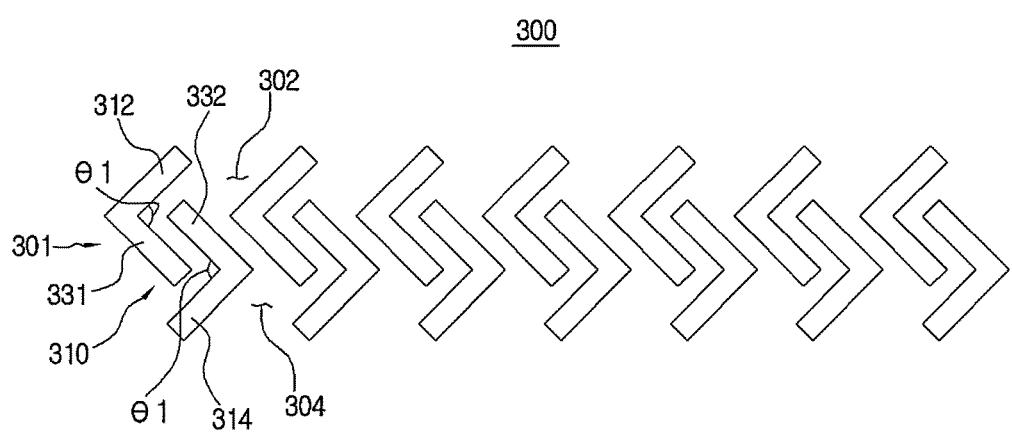
FIG. 15 is a cross-sectional view taken along line C-C' of FIG. 14.
Figure 16:
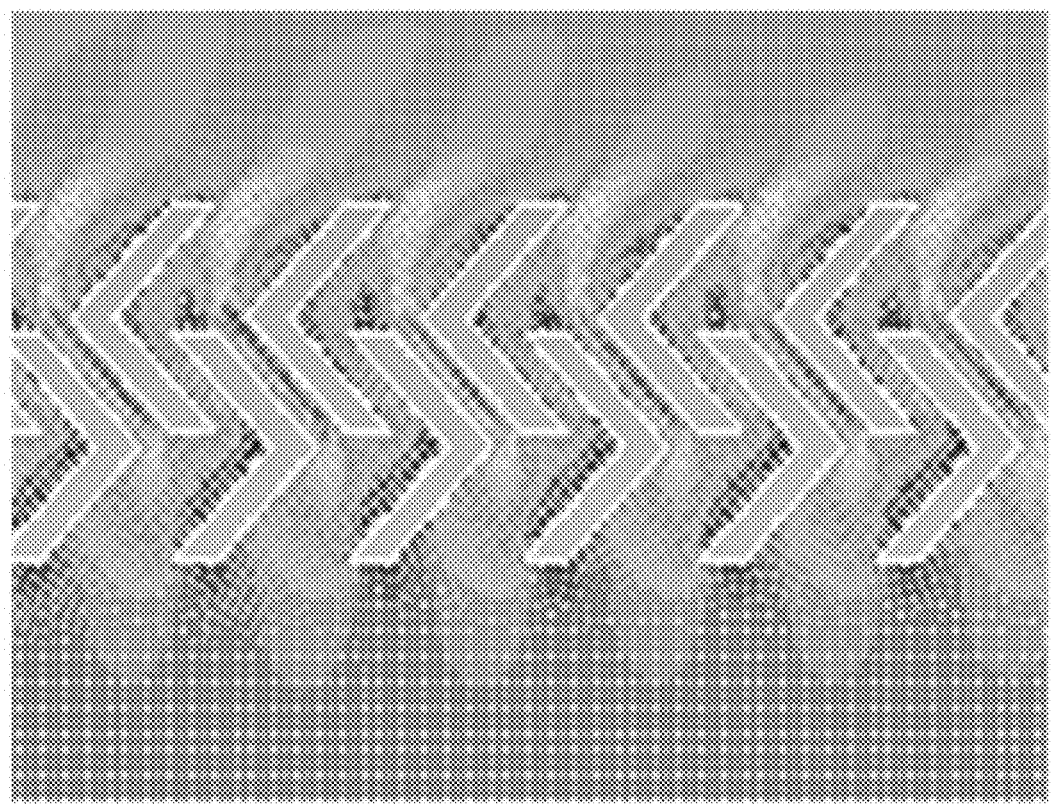
FIG. 16 is a view showing a simulation for testing the velocity of a fluid passing through the grease filter according to the second embodiment of the present disclosure.

FIG. 14 is a perspective view perspective view schematically showing a grease filter according to a second embodiment of the present disclosure, FIG. 15 is a cross-sectional view taken along line C-C' of FIG. 14, and FIG. 16 shows a simulation for testing the velocity of a fluid passing through the grease filter according to the second embodiment of the present disclosure.

The grease filter 300 includes an inlet portion 302 through which oil particles and an air current flow in, and a channel 301 provided with an outlet portion 304 to discharge the oil particles and the air current flowing in through the inlet portion 302 to the outside.

The channel 301 may include an inlet guide 312 arranged spaced apart at predetermined intervals to form an inlet portion 302, an outlet guide 314 arranged spaced apart at predetermined intervals to form an outlet portion 304, and a guide unit 310 provided to change a direction of the oil particles and the air current flowing in through the inlet portion 302.

The guide unit 310 may include a first guide 331 formed to extend from the inlet guide 312, and a second guide 332 formed to extend from the outlet guide 314.

The first guide 331 and the second guide 332 are curved and extend from the inlet guide 312 and the outlet guide 314, respectively, and the first guide 331 and the second guide 332 are arranged to form first angles 81 with the inlet guide 312 and the outlet guide 314, respectively.

In this case, the first angle 81 is preferably greater than or equal to 90°.

However, the first guide 331 formed to be curved at the first angle 81 with respect to the inlet guide 312, and the second guide 332 formed to be curved at the first angle 81 with respect to the outlet guide 314 are arranged to face each other, and thus the first guide 331 and the second guide 332 are preferably arranged parallel to each other.

Therefore, the oil particles and the air current flowing in through the inlet portion 302 are changed in direction in the channel 301, and come in contact with the first guide 331, the second guide 332, and the outlet guide 314 while moving through the guide unit 310, thereby realizing high collection efficiency.

In this way, the collection efficiency of the oil particles may be improved by maximizing the contact area of the oil particles.

According to this embodiment, the guide unit 310 is in a shape in which 'L' letters are inclined at a predetermined angle (approximately 45°) to face each other.

According to this embodiment, a case in which the grease filter 300 includes an edge 21 and a channel 301 provided at an inner portion of the edge 21 is shown by way of example, but aspects of the present disclosure are not limited thereto.

Hereinafter, a grease filter according to a third embodiment of the present disclosure, a manufacturing method thereof, and a cooking device having the same will be described in detail.

In the description, when the configuration of this embodiment overlaps the configurations of the embodiments, a detailed description thereof is omitted for clarity.

Figure 17:
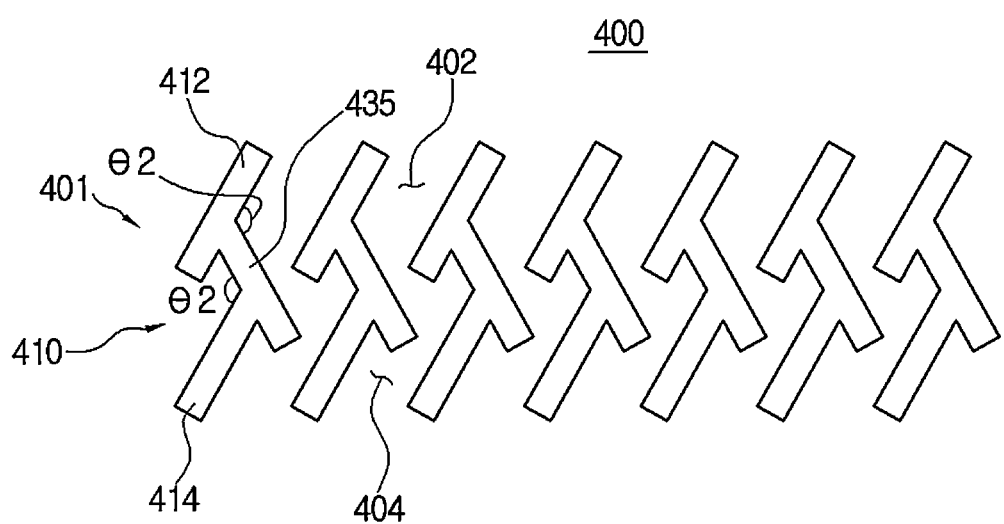
FIG. 17 is a cross-sectional view schematically showing a grease filter according to a third embodiment of the present disclosure.
Figure 18:
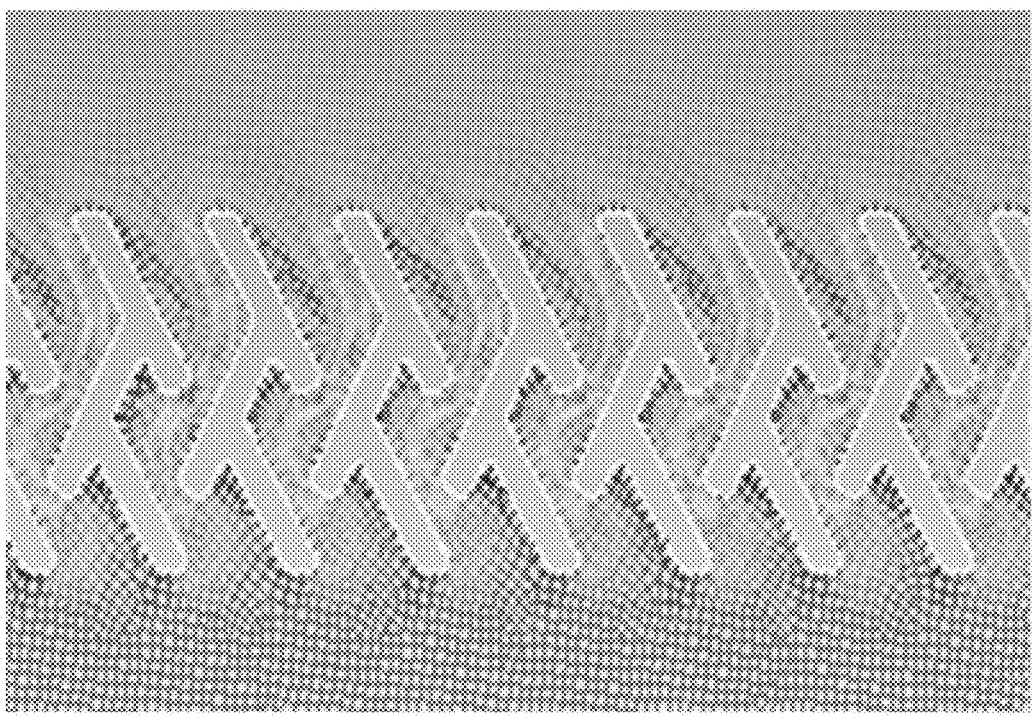
FIG. 18 is a view showing a simulation for testing the velocity of a fluid passing through the grease filter according to the third embodiment of the present disclosure.

FIG. 17 is a cross-sectional view schematically showing a grease filter according to a third embodiment of the present disclosure, and FIG. 18 shows a simulation for testing the velocity of a fluid passing through the grease filter according to the third embodiment of the present disclosure.

As shown in FIGS. 17 and 18, the grease filter 400 according to another embodiment of the present disclosure includes an inlet guide 412 forming an inlet portion 402, an outlet guide 414 forming an outlet portion 404, and a guide unit 410.

The guide unit 410 may include a connection guide 435 to connect the inlet guide 412 to the outlet guide 414.

The connection guide 435 may be formed so that one end of the connection guide 435 is coupled to the inlet guide 412 and a second angle θ2 is formed between the connection guide 435 and the inlet guide 412.

One end of the outlet guide 414 is coupled to the connection guide 435. In this case, the outlet guide 414 may be formed so that a second angle θ2 the outlet guide 414 is formed between the outlet guide 414 and the connection guide 435.

In this case, the second angle θ2 is preferably formed as an obtuse angle of approximately 120° or more.

Therefore, the oil particles and the air current flowing in through the inlet portion 402 formed by the inlet guides 412 are changed in direction by the guide unit 410 between the connection guide 435 and the outlet guide 414, and discharged through the outlet portion 404 while moving along the channel 401.

The oil particles come in contact with the guide unit 410 of the connection guide 435, thereby realizing high collection efficiency.

According to other embodiments of the present disclosure, the guide unit 410 is formed in a branched shape.

Since the specific operations and effects of the grease filter configured thus are sufficiently predictable from the contents as described above, a redundant description thereof is omitted for clarity.

Hereinafter, a grease filter according to a fourth embodiment of the present disclosure, a manufacturing method thereof, and a cooking device having the same will be described in detail.

In the description, when the configuration of this embodiment overlaps the configurations of the embodiments, a detailed description thereof is omitted for clarity.

Figure 19:
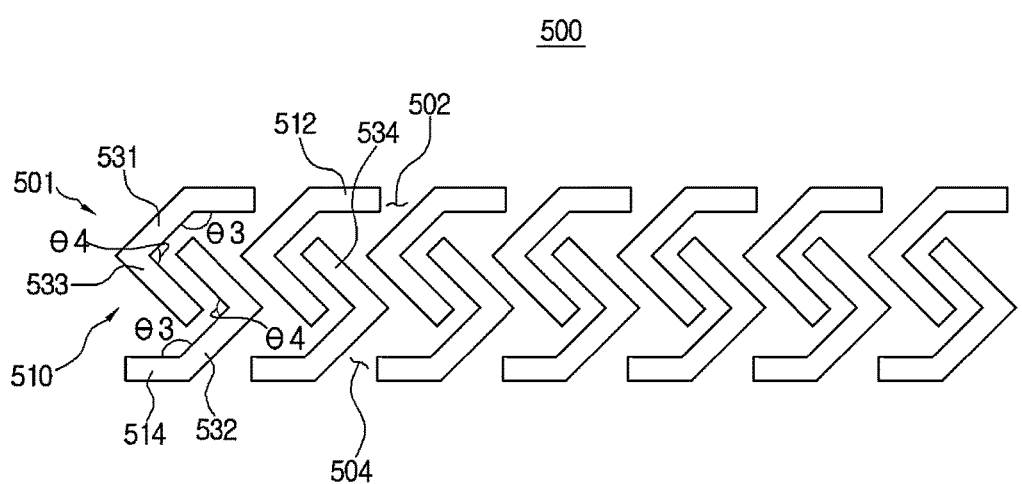
FIG. 19 is a cross-sectional view schematically showing a grease filter according to a fourth embodiment of the present disclosure.
Figure 20:
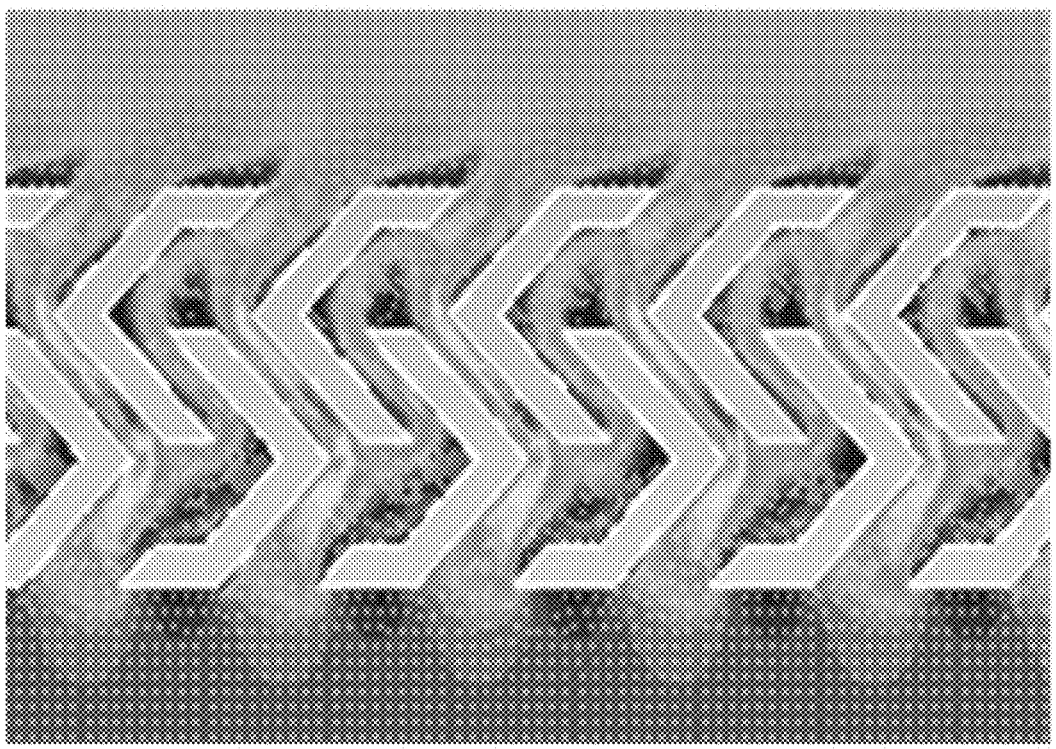
FIG. 20 is a view showing a simulation for testing the velocity of a fluid passing through the grease filter according to the fourth embodiment of the present disclosure.

FIG. 19 is a cross-sectional view schematically showing a grease filter according to a fourth embodiment of the present disclosure, and FIG. 20 shows a simulation for testing the velocity of a fluid passing through the grease filter according to the fourth embodiment of the present disclosure.

As shown in FIGS. 19 and 20, the grease filter 500 according to still another embodiment of the present disclosure may include a channel 501 provided with an inlet portion 502 and an outlet portion 504, and the channel 501 includes a guide unit 510 provided to change a direction of oil particles and an air current flowing in through the inlet portion 502.

The guide unit 510 includes an inlet guide 512 forming an inlet portion 502, an outlet guide 514 forming an outlet portion 504, a first guide 531 formed to extend from the inlet guide 512, a second guide 532 formed to extend from the outlet guide 514, a third guide 533 formed to extend from the first guide 531, and a fourth guide 534 formed to extend from the second guide 532.

In this case, the inlet guide 512 and the outlet guide 514 may be formed horizontally with respect to the inlet portion 502 and the outlet portion 504.

Also, the first guide 531 is preferably arranged to form a third angle θ3 with the inlet guide 512, and the first guide 531 and the third guide 533 are preferably arranged to form a fourth angle θ4 with each other.

Further, the second guide 532 is preferably arranged to form a third angle θ3 with the outlet guide 514, and the second guide 532 and the fourth guide 534 are preferably arranged to form a fourth angle θ4 with each other.

In this case, the third angle θ3 is preferably formed as an angle of 135° or an obtuse angle, and the fourth angle θ4 is preferably formed as an angle of 90°.

Therefore, the oil particles and the air current flowing in through the inlet portion 502 formed by the inlet guides 512 are changed in direction by the inlet guide 512, the outlet guide 514, and the first to fourth guides 534 formed between the inlet guide 512 and the outlet guide 514, and then discharged through the outlet portion 504 while moving along the channel 501.

The oil particles come in contact with the guide unit 510 including the first to fourth guides 531, 532, 533 and 534, thereby realizing high collection efficiency.

Since the specific operations and effects of the grease filter configured thus are sufficiently predictable from the contents as described above, a redundant description thereof is omitted for clarity.

Figure 21:
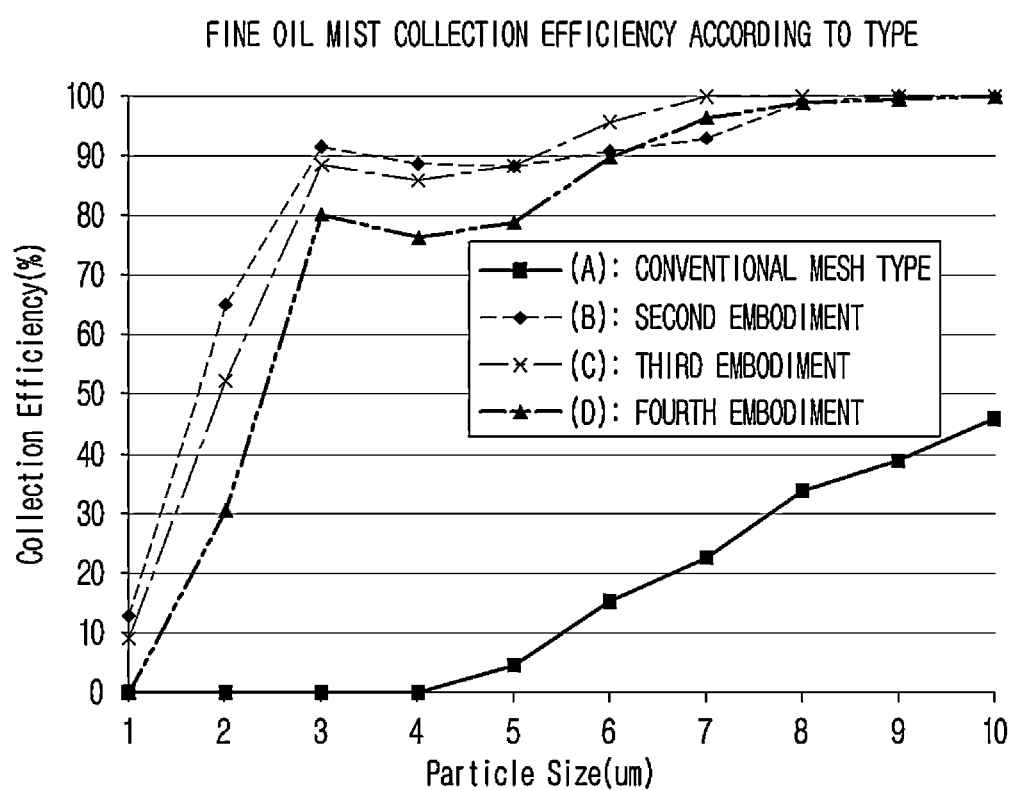
FIG. 21 is a graph showing the collection efficiencies of the grease filters according to the second, third and fourth embodiments of the present disclosure, depending on the particle size.
Figure 22:
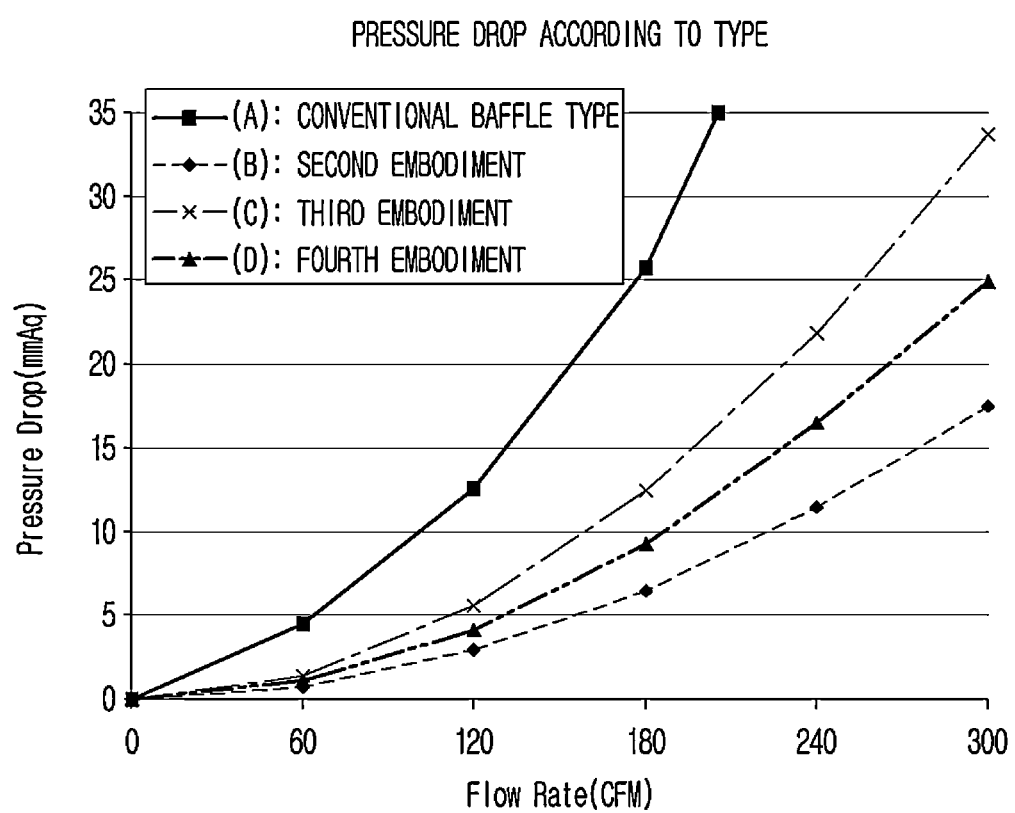
FIG. 22 is a graph showing the pressure drops of the grease filters according to the second, third and fourth embodiments of the present disclosure, depending on the flow rate.

FIG. 21 is a graph showing the collection efficiencies of the grease filters according to the second, third and fourth embodiments of the present disclosure, depending on the particle size, and FIG. 22 is a graph showing the pressure drops of the grease filters according to the second, third and fourth embodiments of the present disclosure, depending on the flow rate.

For the collection efficiency, the air current is analyzed in this simulation for the conventional Mesh Type (A), and the second embodiment (B), the third embodiment (C), and the fourth embodiment (D) of the present disclosure.

The second embodiment of the present disclosure is directed to the grease filter 300 including the guide unit 310 formed in an 'L' shape inclined at an angle of 45° (see FIG. 15), the third embodiment is directed to the grease filter 400 including the guide unit 410 formed in a 'branched' shape (see FIG. 17), and the fourth embodiment (D) is directed to the grease filter 500 including the guide unit 510 formed in a 'G' shape (see FIG. 19).

As a result, it was revealed that the collection efficiency of fine oil mist is approximately 82.9%, and the pressure drop is approximately 3.0 mmAq (based on 120 CFM) in the case of the second embodiment (B), the collection efficiency of fine oil mist is approximately 75.1%, and the pressure drop is approximately 4.2 mmAq (based on 120 CFM) in the case of the third embodiment (C), and the collection efficiency of fine oil mist is approximately 81.9%, and the pressure drop is approximately 5.6 mmAq (based on 120 CFM) in the case of fourth embodiment (D), indicating that the second to fourth embodiments show higher collection efficiencies than the conventional Mesh Type (A).

As shown in FIG. 21, the pressure drop is also analyzed for the conventional Baffle (A), and the second embodiment (B), the third embodiment (C), and the fourth embodiment (D) of the present disclosure.

As a result, it was revealed that the second embodiment (B) of the present disclosure shows the lowest pressure drop.

As are seen from the graphs of FIGS. 21 and 22, it was revealed that the structures (B, C and D) including the guide unit according to the embodiments exhibit superior performance to the conventional structure (A).

The grease filter according to one embodiment of the present disclosure can be useful in reducing the pressure drop caused by the flow of air including oil particles and improving oil collection efficiency. Also, filtering efficiency may be continuously maintained due to the improved structure of the grease filter.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A grease filter comprising:
a first baffle plate including a plurality of inlet portions through which an air flows in and a plurality of first guide members by which the air flowing through the plurality of inlet portions is guided towards a second baffle plate, and
the second baffle plate arranged to face the first baffle plate, the second baffle plate including a plurality of outlet portions through which the air flows out and a plurality of second guide members by which the air flowing out through the plurality of outlet portions is guided,
wherein the second baffle plate is separable from the first baffle plate in entirety by slidably moving only in a horizontal direction with respect to the first baffle plate.

2. The grease filter of claim 1, wherein the first baffle plate and the second baffle plate are formed so that the first baffle plate and the second baffle plate are at least partially separated from each other.

3. The grease filter of claim 1, wherein each of the first baffle plate and the second baffle plate comprises a stopper to prevent the first baffle plate and the second baffle plate from being separated beyond predetermined bounds.

4. The grease filter of claim 1, wherein the first baffle plate coupled to the second baffle plate moves within a guide gap that is a gap between one of the plurality of first guide members and another first guide member adjacent to the one of the plurality of first guide members, and then is separable in a direction opposite to a facing direction of the second baffle plate with respect to the guide gap.

5. The grease filter of claim 1, wherein the plurality of first guide members and the plurality of second guide members are provided in S-letter shapes, respectively.

6. The grease filter of claim 1, wherein each of the first baffle plate and the second baffle plate is formed by press processing.

7. The grease filter of claim 1, wherein the first baffle plate and the second baffle plate are formed of a metal material.

8. The grease filter of claim 1, wherein the plurality of first guide members and the plurality of second guide members are alternately arranged.

9. The grease filter of claim 8, wherein the plurality of first guide members and the plurality of second guide members are arranged in plural numbers to be spaced apart at predetermined intervals.

10. The grease filter of claim 1, wherein:
each of the plurality of first guide members comprises
an inlet guide inclined obliquely toward the second baffle plate; and
a first direction change guide curved from the inlet guide, and each of the plurality of second guide members comprises
an outlet guide inclined obliquely toward the first baffle plate; and
a second direction change guide curved from the outlet guide.

11. The grease filter of claim 10, wherein the first direction change guide and the second direction change guide are formed spaced apart to face each other.

12. The grease filter of claim 10, wherein:
the first baffle plate and the second baffle plate further comprise a first frame and a second frame, respectively, the first frame and the second frame being in a case shape, and the plurality of first guide members and the plurality of second guide members are fixed in the first frame and the second frame, respectively,
the plurality of first guide members comprises a first support member formed to extend from the inlet guide and fixed in the first frame, and
the plurality of second guide members comprises a second support member formed to extend from the outlet guide and fixed in the second frame.

13. The grease filter of claim 12, wherein:
the first support member is provided to form an obtuse angle with a first inlet plane that is one surface of the inlet guide, and
the first direction change guide is provided to form an obtuse angle with a second inlet plane that is the other surface of the first inlet plane.

14. The grease filter of claim 12, wherein:
the second support member is provided to form an obtuse angle with a first outlet surface of the outlet guide, and
the second direction change guide is provided to form an obtuse angle with a second outlet surface that is a surface opposite to the first outlet surface.

15. The grease filter of claim 12, wherein:
the first baffle plate and the second baffle plate are among a plurality of first baffle plates and a plurality of second baffle plates, respectively,
the plurality of first baffle plates are provided to overlap so that a first support member of one of the plurality of first baffle plates is arranged on an inlet portion of another of the plurality of first baffle plates, and
the plurality of second baffle plates are provided to overlap so that a second support member of one of the plurality of second baffle plates is arranged on an outlet portion of another of the plurality of second baffle plates.

16. The grease filter of claim 10, further comprising a path formed by the first baffle plate and the second baffle plate, wherein the path comprises
a direction change path spanning between the first direction change guide and the second direction change guide; and
a guide path bypassing the first direction change guide and the second direction change guide and formed between the inlet guide and the outlet guide.

17. The grease filter of claim 16, wherein the direction change path is formed so that the direction change path has a longer course than the guide path.

18. The grease filter of claim 16, wherein each of the first baffle plate and the second baffle plate comprises:
a filtering mode operated to enable flow of an air current through the direction change path and the guide path; and
a ventilation mode operated to allow the first direction change guide and the second direction change guide to closely adhere to each other so as to close the direction change path.

19. The grease filter of claim 18, wherein each of the first baffle plate and the second baffle plate further comprises a release mode operated to allow the inlet guide and the outlet guide to closely adhere to each other so that the first baffle plate and the second baffle plate are spaced apart in a facing direction.

20. A grease filter comprising:
a first baffle plate formed by press processing and including a plurality of inlet portions through which an air flows in, and a plurality of first guide members by which the air flowing through the plurality of inlet portions is guided towards a second baffle plate, and
the second baffle plate formed by press processing and arranged to face the first baffle plate, the second baffle plate including a plurality of outlet portions through which the air flows out and a plurality of second guide members by which the air flowing out through the plurality of outlet portions is guided,
wherein the second baffle plate is separable from the first baffle plate in entirety by slidably moving only in a horizontal direction with respect to the first baffle plate.

21. The grease filter of claim 20, wherein the plurality of first guide members of the first baffle plate are arranged side by side with the plurality of second guide members of the second baffle plate.

22. The grease filter of claim 20, wherein:
the first baffle plate is among a plurality of first baffle plates stacked with each other,
the second baffle plate is among a plurality of second baffle plates configured to face the plurality of first baffle plates and stacked with each other, and
the plurality of second guide members provided at the plurality of second baffle plates are arranged alternately with the plurality of first guide members.

23. The grease filter of claim 22, wherein:
the plurality of first guide members are formed in a first direction that is a longitudinal direction,
the plurality of second guide members are formed in a second direction opposite to the first direction, and
the plurality of first baffle plates and the plurality of second baffle plates move in the first direction and the second direction, respectively, so that the plurality of first baffle plates and the plurality of second baffle plates are provided to be at least partially spaced apart from each other.

24. The grease filter of claim 23, wherein:
each of the plurality of first baffle plates comprises a first stopper, and
each of the plurality of second baffle plates comprises a second stopper provided to limit a movement thereof within predetermined bounds by the first stopper while moving in the second direction.

25. The grease filter of claim 22, wherein:
the plurality of first guide members comprise
a plurality of inlet guides inclined obliquely toward the plurality of second baffle plates; and
a plurality of first direction change guides curved from the plurality of inlet guides, and
the plurality of second guide members comprise
a plurality of outlet guides inclined obliquely toward the plurality of first baffle plates; and
a plurality of second direction change guides curved from the plurality of outlet guides.

26. The grease filter of claim 25, wherein the plurality of inlet guides and the plurality of outlet guides are arranged side by side with each other.

27. The grease filter of claim 25, wherein the plurality of first direction change guides and the plurality of second direction change guides are formed spaced apart to face each other.

28. The grease filter of claim 25, wherein the path comprises:
   a direction change path spanning between the plurality of first direction change guides and the plurality of second direction change guides; and
   a guide path spanning between the inlet guides and the outlet guides to bypass the direction change guide.

29. The grease filter of claim 28, wherein the direction change path is formed to have a longer course than the guide path.

30. A grease filter comprising:
   a first baffle plate formed by press processing and including a plurality of inlet portions through which air flows in and a plurality of first guide members by which the air flowing in through the plurality of inlet portions is guided towards a second baffle plate, and
   the second baffle plate formed by press processing and arranged to face the first baffle plate, the second baffle plate including a plurality of outlet portions through which the air flows out and a plurality of second guide members by which the air flowing out through the plurality of outlet portions is guided,
   wherein the second baffle plate is separable from the first baffle plate in entirely by slidably moving only in a horizontal direction with respect to the first baffle plate.

31. The grease filter of claim 30, wherein:
   the plurality of first guide members comprise
      a plurality of inlet guides inclined obliquely toward the second baffle plate; and
      a plurality of first direction change guides curved from the plurality of inlet guides, and
   the plurality of second guide members comprise
      a plurality of outlet guide inclined obliquely toward the first baffle plate; and
      a plurality of second direction change guides curved from the plurality of outlet guides.

32. The grease filter of claim 31, further comprising a path formed by the plurality of first guide members and the plurality of second guide members,
   wherein the path comprises
      a direction change path spanning between the plurality of first direction change guides and the plurality of second direction change guides; and
      a guide path spanning between the inlet guides and the outlet guides to bypass the direction change guide.

33. The grease filter of claim 32, wherein:
   the first baffle plate and the second baffle plate are operated in a first mode to enable the flow of the air through the direction change path and the guide path, and operated in a second mode to allow the first direction change guide and the second direction change guide to adhere to each other so as to close the direction change path.

34. The grease filter of claim 33, wherein the second mode is formed so that the direction change path has a narrower width than the guide path, compared to the first mode.

35. The grease filter of claim 33, wherein each of the first baffle plate and the second baffle plate further comprises a third mode operated to allow the inlet guides and the outlet guides to adhere to each other so that the first baffle plate and the second baffle plate are spaced apart in a facing direction.

36. The grease filter of claim 32, wherein:
   each of the first baffle plate and the second baffle plate comprises an inlet port and an outlet port formed between the plurality of first guide members and the plurality of second guide members to allow an air current to flow in and out therethrough, and
   the path is formed to span from the inlet port to the outlet port.

\* \* \* \* \*